US008562403B2

(12) United States Patent
Boch et al.

(10) Patent No.: US 8,562,403 B2
(45) Date of Patent: Oct. 22, 2013

(54) PROMPTING A PLAYER OF A DANCE GAME

(75) Inventors: Matthew C. Boch, Somerville, MA (US); Kasson D. Crooker, Arlington, MA (US); Dean N. Tate, Cambridge, MA (US); Isaac Adams, Revere, MA (US); Adam Carriuolo, Rehoboth, MA (US); Eitan Glinert, Cambridge, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 122 days.

(21) Appl. No.: 13/158,050

(22) Filed: Jun. 10, 2011

(65) Prior Publication Data

US 2011/0306398 A1 Dec. 15, 2011

Related U.S. Application Data

(63) Continuation-in-part of application No. 12/940,794, filed on Nov. 5, 2010.

(60) Provisional application No. 61/354,073, filed on Jun. 11, 2010.

(51) Int. Cl.
*A63F 9/24* (2006.01)

(52) U.S. Cl.
USPC .................................. 463/7; 463/9

(58) Field of Classification Search
USPC .......................................... 463/7, 9
See application file for complete search history.

(56) References Cited

U.S. PATENT DOCUMENTS

| D211,666 S | 7/1968 | MacGillavry |
| 3,430,530 A | 3/1969 | Fletcher |
| 3,897,711 A | 8/1975 | Elledge |

(Continued)

FOREIGN PATENT DOCUMENTS

| AT | 468071 T | 6/2010 |
| AU | 741239 B2 | 4/1999 |

(Continued)

OTHER PUBLICATIONS

Amplitude for Playstation. Retrieved from the Internet: www.target.com/gp/detail.hbnl/601-0682676-9911341?asin=B0000859TM&AFID. Retrieved on Feb. 22, 2005. 1 page.

(Continued)

*Primary Examiner* — Pierre E Elisca
(74) *Attorney, Agent, or Firm* — Wilmer Cutler Pickering Hale and Dorr LLP

(57) ABSTRACT

Presented herein are methods, apparatuses, programs, and systems for prompting a player to perform a series of dance moves. A player is prompted to perform a series of dance moves by providing a timeline comprising at least a first time interval associated with a first dance move, and a second time interval associated with a second dance move; displaying an icon representing the first dance move at a first location on the display for the duration of the first time interval; and displaying an icon representing the second dance move at the first location on the display for the duration of the second time interval, wherein the icon representing the first dance move includes one or more representations of a body and indicates on the one or more representations of the body at least one body part whose position is important during the performance of the first dance move.

20 Claims, 12 Drawing Sheets

(56) References Cited

U.S. PATENT DOCUMENTS

| | | |
|---|---|---|
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| 4,766,541 A | 8/1988 | Bleich et al. |
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Bolas et al. |
| 5,524,637 A | 6/1996 | Erickson |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,693,903 A | 12/1997 | Heidorn et al. |
| D389,216 S | 1/1998 | Isetani et al. |
| 5,704,836 A | 1/1998 | Norton et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,777,251 A | 7/1998 | Hotta et al. |
| 5,782,692 A | 7/1998 | Stelovsky |
| D398,916 S | 9/1998 | Bernardi |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,833,469 A | 11/1998 | Ito et al. |
| D403,024 S | 12/1998 | Muraki et al. |
| 5,861,881 A | 1/1999 | Freeman et al. |
| 5,874,686 A | 2/1999 | Ghias et al. |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A * | 12/1999 | Ota ................................. 463/7 |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |
| 6,184,899 B1 | 2/2001 | Akemann |
| 6,191,350 B1 | 2/2001 | Okulov et al. |
| 6,215,411 B1 | 4/2001 | Gothard |
| 6,224,486 B1 | 5/2001 | Walker et al. |
| 6,225,547 B1 | 5/2001 | Toyama et al. |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,268,557 B1 | 7/2001 | Devecka |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,342,665 B1 | 1/2002 | Okita et al. |
| 6,347,998 B1 | 2/2002 | Yoshitomi et al. |
| 6,350,942 B1 | 2/2002 | Thomson |
| 6,352,432 B1 | 3/2002 | Tsai et al. |
| 6,353,174 B1 | 3/2002 | Schmidt et al. |

(56) References Cited

U.S. PATENT DOCUMENTS

| | | |
|---|---|---|
| D455,792 S | 4/2002 | Isetani et al. |
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |
| 6,390,923 B1 | 5/2002 | Yoshitomi et al. |
| 6,392,133 B1 | 5/2002 | Georges |
| 6,407,324 B1 | 6/2002 | Hulcher |
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| 6,438,611 B1 | 8/2002 | Hara et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,483,018 B2 | 11/2002 | Mead |
| 6,504,089 B1 | 1/2003 | Negishi et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,541,692 B2 | 4/2003 | Miller |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,629,892 B2 | 10/2003 | Oe et al. |
| 6,634,886 B2 | 10/2003 | Oyama et al. |
| 6,636,877 B1 | 10/2003 | Doleac et al. |
| 6,638,160 B2 | 10/2003 | Yoshitomi |
| 6,645,067 B1 | 11/2003 | Okita et al. |
| 6,645,076 B1 | 11/2003 | Sugai |
| 6,645,784 B2 | 11/2003 | Tayebati et al. |
| 6,653,545 B2 | 11/2003 | Redmann et al. |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,712,692 B2 | 3/2004 | Basson et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,801,930 B1 | 10/2004 | Dionne et al. |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |
| 6,838,608 B2 | 1/2005 | Koike |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,905,413 B1 | 6/2005 | Terao et al. |
| 6,909,420 B1 | 6/2005 | Nicolas et al. |
| 6,915,488 B2 | 7/2005 | Omori et al. |
| 6,921,332 B2 | 7/2005 | Fukunaga et al. |
| 6,924,425 B2 | 8/2005 | Naples et al. |
| 6,930,235 B2 | 8/2005 | Sandborn et al. |
| 6,930,236 B2 | 8/2005 | Jung |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |
| 7,030,307 B2 | 4/2006 | Wedel |
| 7,030,311 B2 | 4/2006 | Brinkman et al. |
| 7,037,197 B2 | 5/2006 | Watanabe |
| 7,038,855 B2 | 5/2006 | French et al. |
| 7,044,856 B2 | 5/2006 | Suzuki |
| 7,044,857 B1 | 5/2006 | Klitsner et al. |
| 7,064,672 B2 | 6/2006 | Gothard |
| 7,066,818 B2 | 6/2006 | Ikeda |
| 7,069,296 B2 | 6/2006 | Moller et al. |
| 7,070,500 B1 | 7/2006 | Nomi et al. |

(56) References Cited

U.S. PATENT DOCUMENTS

| | | | |
|---|---|---|---|
| 7,071,914 B1 | 7/2006 | Marks |
| 7,076,052 B2 | 7/2006 | Yoshimura |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,129,408 B2 | 10/2006 | Uehara |
| 7,134,876 B2 | 11/2006 | Hou |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,075 B2 | 1/2007 | Tada |
| 7,164,076 B2 | 1/2007 | McHale et al. |
| 7,169,998 B2 | 1/2007 | Kondo et al. |
| 7,170,510 B2 | 1/2007 | Kawahara et al. |
| 7,174,510 B2 | 2/2007 | Salter |
| 7,189,912 B2 | 3/2007 | Jung |
| 7,192,353 B2 | 3/2007 | Okubo |
| 7,194,676 B2 | 3/2007 | Fayan et al. |
| 7,199,298 B2 | 4/2007 | Funaki |
| 7,199,801 B2 | 4/2007 | Tsunashima et al. |
| 7,201,659 B2 | 4/2007 | Nakayama et al. |
| 7,221,852 B2 | 5/2007 | Iizuka et al. |
| 7,223,913 B2 | 5/2007 | Knapp et al. |
| 7,227,526 B2 | 6/2007 | Hildreth et al. |
| 7,259,357 B2 | 8/2007 | Walker |
| 7,259,971 B1 | 8/2007 | Allen et al. |
| 7,263,668 B1 | 8/2007 | Lentz |
| 7,271,329 B2 | 9/2007 | Franzblau |
| 7,272,780 B2 | 9/2007 | Abbott et al. |
| 7,274,803 B1 | 9/2007 | Sharma et al. |
| 7,304,232 B1 | 12/2007 | Nicholes |
| 7,320,643 B1 | 1/2008 | Brosius et al. |
| 7,323,631 B2 | 1/2008 | Miyaki et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| D569,382 S | 5/2008 | Yow et al. |
| 7,367,887 B2 | 5/2008 | Watabe et al. |
| 7,383,508 B2 | 6/2008 | Toyama et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,423,213 B2 | 9/2008 | Sitrick |
| 7,430,360 B2 | 9/2008 | Abecassis |
| 7,432,810 B2 | 10/2008 | Menache et al. |
| 7,435,178 B1 | 10/2008 | Tam et al. |
| 7,453,035 B1 | 11/2008 | Evans et al. |
| 7,458,025 B2 | 11/2008 | Crow et al. |
| 7,459,324 B1 | 12/2008 | Ptasinski et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| 7,488,886 B2 | 2/2009 | Kemp |
| D590,407 S | 4/2009 | Watanabe et al. |
| 7,521,619 B2 | 4/2009 | Salter |
| 7,528,315 B2 | 5/2009 | Goodwin |
| 7,536,654 B2 | 5/2009 | Anthony et al. |
| 7,546,130 B2 | 6/2009 | Vance |
| 7,559,834 B1 | 7/2009 | York |
| 7,559,841 B2 | 7/2009 | Hashimoto |
| 7,579,543 B2 | 8/2009 | Haruyama et al. |
| D599,812 S | 9/2009 | Hirsch |
| D599,819 S | 9/2009 | Lew |
| 7,582,015 B2 | 9/2009 | Onoda et al. |
| 7,589,727 B2 | 9/2009 | Haeker |
| 7,593,618 B2 | 9/2009 | Xu et al. |
| 7,599,554 B2 | 10/2009 | Agnihotri et al. |
| 7,605,322 B2 | 10/2009 | Nakamura |
| 7,612,278 B2 | 11/2009 | Sitrick et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| 7,649,134 B2 | 1/2010 | Kashioka |
| D609,715 S | 2/2010 | Chaudhri |
| 7,660,510 B2 | 2/2010 | Kawahara et al. |
| 7,660,700 B2 | 2/2010 | Moskowitz et al. |
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,772,480 B2 | 8/2010 | Brennan |
| 7,774,706 B2 | 8/2010 | Sakai |
| 7,789,741 B1 | 9/2010 | Fields et al. |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,823,070 B2 | 10/2010 | Nelson et al. |
| 7,829,777 B2 | 11/2010 | Kyuma et al. |
| 7,838,755 B2 | 11/2010 | Taub et al. |
| 7,840,907 B2 | 11/2010 | Kikuchi et al. |
| D628,582 S | 12/2010 | Kurozumi et al. |
| 7,853,896 B2 | 12/2010 | Ok et al. |
| 7,853,897 B2 | 12/2010 | Ogawa et al. |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,893,337 B2 | 2/2011 | Lenz |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| 7,973,230 B2 | 7/2011 | Mahowald |
| 7,980,997 B2 | 7/2011 | Thukral et al. |
| 7,982,114 B2 | 7/2011 | Applewhite et al. |
| 8,003,872 B2 | 8/2011 | Lopiccolo et al. |
| 8,010,088 B2 | 8/2011 | Cheng |
| 8,026,435 B2 | 9/2011 | Stoddard et al. |
| 8,057,290 B2 | 11/2011 | Vance et al. |
| D650,802 S | 12/2011 | Jang et al. |
| 8,076,564 B2 | 12/2011 | Applewhite |
| 8,076,574 B2 | 12/2011 | Irmer et al. |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,176,439 B2 | 5/2012 | Kamen et al. |
| 8,198,526 B2 | 6/2012 | Izen et al. |
| 8,202,161 B2 | 6/2012 | Leake et al. |
| 8,205,172 B2 | 6/2012 | Wong et al. |

(56) References Cited

U.S. PATENT DOCUMENTS

| | | |
|---|---|---|
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |
| D664,975 S | 8/2012 | Arnold |
| 2001/0004861 A1 | 6/2001 | Suzuki et al. |
| 2001/0007824 A1 | 7/2001 | Fukuda |
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014620 A1 | 8/2001 | Nobe et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0033287 A1 | 10/2001 | Naegle et al. |
| 2001/0035868 A1 | 11/2001 | Uehara et al. |
| 2001/0036861 A1 | 11/2001 | Uehara et al. |
| 2001/0037181 A1 | 11/2001 | Matsuura et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0002900 A1 | 1/2002 | Cho |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0019258 A1 | 2/2002 | Kim et al. |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025842 A1 | 2/2002 | Nobe et al. |
| 2002/0025853 A1 | 2/2002 | Kojima et al. |
| 2002/0027899 A1 | 3/2002 | Ikeda |
| 2002/0032054 A1 | 3/2002 | Hosoya |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0091455 A1 | 7/2002 | Williams |
| 2002/0091847 A1 | 7/2002 | Curtin |
| 2002/0094865 A1 | 7/2002 | Araki et al. |
| 2002/0094866 A1 | 7/2002 | Takeda et al. |
| 2002/0105229 A1 | 8/2002 | Tanaka |
| 2002/0119811 A1 | 8/2002 | Yabe et al. |
| 2002/0128736 A1 | 9/2002 | Yoshida et al. |
| 2002/0142818 A1 | 10/2002 | Nakatsuka et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160824 A1 | 10/2002 | Goto et al. |
| 2002/0169014 A1 | 11/2002 | Egozy et al. |
| 2002/0187835 A1 | 12/2002 | Nakayama et al. |
| 2002/0198045 A1 | 12/2002 | Okubo |
| 2003/0000364 A1 | 1/2003 | Deverich |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0014262 A1 | 1/2003 | Kim |
| 2003/0017872 A1 | 1/2003 | Oishi et al. |
| 2003/0028598 A1 | 2/2003 | Moller et al. |
| 2003/0032478 A1 | 2/2003 | Takahama et al. |
| 2003/0045334 A1 | 3/2003 | Hosokawa |
| 2003/0069071 A1 | 4/2003 | Britt et al. |
| 2003/0070159 A1 | 4/2003 | Webb |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0151628 A1 | 8/2003 | Salter |
| 2003/0164084 A1 | 9/2003 | Redmann et al. |
| 2003/0195041 A1 | 10/2003 | McCauley |
| 2003/0199317 A1 | 10/2003 | McCauley |
| 2003/0214498 A1 | 11/2003 | Gothard |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0005924 A1* | 1/2004 | Watabe et al. .................. 463/36 |
| 2004/0012540 A1 | 1/2004 | Treibitz et al. |
| 2004/0021684 A1 | 2/2004 | Millner |
| 2004/0054725 A1 | 3/2004 | Moller et al. |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0089139 A1 | 5/2004 | Georges et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0093354 A1 | 5/2004 | Xu et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0123726 A1 | 7/2004 | Kato et al. |
| 2004/0127282 A1 | 7/2004 | Naobayashi |
| 2004/0127285 A1* | 7/2004 | Kavana .......................... 463/36 |
| 2004/0127291 A1 | 7/2004 | George et al. |
| 2004/0132518 A1 | 7/2004 | Uehara et al. |
| 2004/0132531 A1 | 7/2004 | George et al. |
| 2004/0137984 A1 | 7/2004 | Salter |
| 2004/0152514 A1 | 8/2004 | Kasai et al. |
| 2004/0154460 A1 | 8/2004 | Virolainen et al. |
| 2004/0181592 A1 | 9/2004 | Samra et al. |
| 2004/0186720 A1 | 9/2004 | Kemmochi |
| 2004/0204211 A1 | 10/2004 | Suzuki |
| 2004/0204238 A1 | 10/2004 | Aoki |
| 2004/0205204 A1 | 10/2004 | Chafe |
| 2004/0207774 A1 | 10/2004 | Gothard |
| 2004/0209673 A1 | 10/2004 | Shiraishi |
| 2004/0229685 A1 | 11/2004 | Smith et al. |
| 2004/0236543 A1 | 11/2004 | Stephens |
| 2004/0239678 A1 | 12/2004 | Tsunashima et al. |
| 2004/0243482 A1 | 12/2004 | Laut |
| 2004/0254016 A1 | 12/2004 | Shimazaki |
| 2004/0259631 A1 | 12/2004 | Katz et al. |
| 2004/0259632 A1 | 12/2004 | Crittenden et al. |
| 2004/0259644 A1 | 12/2004 | McCauley |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0054440 A1 | 3/2005 | Anderson et al. |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1 | 3/2005 | Rodriquez et al. |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0115383 A1 | 6/2005 | Chang |

(56) References Cited

U.S. PATENT DOCUMENTS

| | | |
|---|---|---|
| 2005/0120865 A1 | 6/2005 | Tada |
| 2005/0120868 A1 | 6/2005 | Hinman et al. |
| 2005/0143174 A1 | 6/2005 | Goldman et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |
| 2005/0250565 A1 | 11/2005 | Nojiri et al. |
| 2005/0252362 A1 | 11/2005 | McHale et al. |
| 2005/0255914 A1 | 11/2005 | McHale et al. |
| 2005/0255923 A1 | 11/2005 | Aoki |
| 2005/0273319 A1 | 12/2005 | Dittmar et al. |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0026304 A1 | 2/2006 | Price |
| 2006/0030382 A1 | 2/2006 | Okamura et al. |
| 2006/0032085 A1* | 2/2006 | Randall ............................ 36/8.3 |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |
| 2006/0166744 A1 | 7/2006 | Igarashi et al. |
| 2006/0175758 A1 | 8/2006 | Riolo |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252503 A1 | 11/2006 | Salter |
| 2006/0258450 A1 | 11/2006 | Ishihata et al. |
| 2006/0266200 A1 | 11/2006 | Goodwin |
| 2006/0287106 A1 | 12/2006 | Jensen |
| 2006/0288842 A1 | 12/2006 | Sitrick et al. |
| 2006/0290810 A1 | 12/2006 | Mallinson |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0140510 A1 | 6/2007 | Redmann |
| 2007/0155494 A1 | 7/2007 | Wells et al. |
| 2007/0162497 A1 | 7/2007 | Pauws |
| 2007/0163427 A1 | 7/2007 | Rigopulos et al. |
| 2007/0163428 A1 | 7/2007 | Salter |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0009346 A1 | 1/2008 | Jessop et al. |
| 2008/0026355 A1 | 1/2008 | Petef |
| 2008/0053295 A1 | 3/2008 | Goto et al. |
| 2008/0076497 A1 | 3/2008 | Kiskis et al. |
| 2008/0096654 A1 | 4/2008 | Mondesir et al. |
| 2008/0101762 A1 | 5/2008 | Kellock et al. |
| 2008/0102958 A1 | 5/2008 | Kitamura et al. |
| 2008/0113698 A1 | 5/2008 | Egozy |
| 2008/0113797 A1 | 5/2008 | Egozy |
| 2008/0115657 A1 | 5/2008 | Wakiyama |
| 2008/0125229 A1 | 5/2008 | Jonishi |
| 2008/0146342 A1 | 6/2008 | Harvey et al. |
| 2008/0155421 A1 | 6/2008 | Ubillos et al. |
| 2008/0184870 A1 | 8/2008 | Toivola et al. |
| 2008/0192736 A1 | 8/2008 | Jabri et al. |
| 2008/0200224 A1 | 8/2008 | Parks |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0268943 A1 | 10/2008 | Jacob |
| 2008/0273755 A1 | 11/2008 | Hildreth |
| 2008/0276175 A1 | 11/2008 | Kim et al. |
| 2008/0288866 A1 | 11/2008 | Spencer et al. |
| 2008/0289477 A1 | 11/2008 | Salter |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0038467 A1 | 2/2009 | Brennan |
| 2009/0069096 A1 | 3/2009 | Nishimoto |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0122146 A1 | 5/2009 | Zalewski et al. |
| 2009/0135135 A1 | 5/2009 | Tsurumi |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0215533 A1 | 8/2009 | Zalewski et al. |
| 2009/0222392 A1 | 9/2009 | Martin et al. |
| 2009/0228544 A1 | 9/2009 | Demers et al. |
| 2009/0231425 A1 | 9/2009 | Zalewski |
| 2009/0233714 A1 | 9/2009 | Toro |
| 2009/0241758 A1 | 10/2009 | Neubacker |
| 2009/0258686 A1 | 10/2009 | McCauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0265668 A1 | 10/2009 | Esser et al. |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035688 A1 | 2/2010 | Picunko |
| 2010/0041477 A1 | 2/2010 | Kay et al. |
| 2010/0062405 A1 | 3/2010 | Zboray et al. |
| 2010/0064238 A1 | 3/2010 | Ludwig |
| 2010/0080528 A1 | 4/2010 | Yen et al. |
| 2010/0087240 A1 | 4/2010 | Egozy et al. |
| 2010/0100848 A1 | 4/2010 | Ananian et al. |

(56) References Cited

U.S. PATENT DOCUMENTS

| | | |
|---|---|---|
| 2010/0113117 A1 | 5/2010 | Ku et al. |
| 2010/0120470 A1 | 5/2010 | Kim et al. |
| 2010/0137049 A1 | 6/2010 | Epstein |
| 2010/0138785 A1 | 6/2010 | Uoi |
| 2010/0144436 A1 | 6/2010 | Marks et al. |
| 2010/0151948 A1 | 6/2010 | Vance et al. |
| 2010/0160038 A1 | 6/2010 | Youm et al. |
| 2010/0161432 A1 | 6/2010 | Kumanov et al. |
| 2010/0186579 A1 | 7/2010 | Schnitman |
| 2010/0192106 A1 | 7/2010 | Watanabe et al. |
| 2010/0199221 A1 | 8/2010 | Yeung |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0238182 A1 | 9/2010 | Geisner et al. |
| 2010/0245241 A1 | 9/2010 | Kim et al. |
| 2010/0247081 A1 | 9/2010 | Victoria Pons |
| 2010/0255398 A1 | 10/2010 | Jacobson et al. |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0300272 A1 | 12/2010 | Scherf |
| 2010/0304810 A1 | 12/2010 | Stoddard |
| 2010/0304811 A1 | 12/2010 | Schmidt et al. |
| 2010/0304812 A1 | 12/2010 | Stoddard et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2011/0010667 A1 | 1/2011 | Sakai et al. |
| 2011/0021273 A1 | 1/2011 | Buckley et al. |
| 2011/0028214 A1 | 2/2011 | Bright et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0098106 A1 | 4/2011 | He et al. |
| 2011/0098109 A1 | 4/2011 | Leake et al. |
| 2011/0111850 A1 | 5/2011 | Beerhorst et al. |
| 2011/0118621 A1 | 5/2011 | Chu |
| 2011/0140931 A1 | 6/2011 | Geurts et al. |
| 2011/0151975 A1 | 6/2011 | Mori |
| 2011/0159938 A1 | 6/2011 | Umeda |
| 2011/0185309 A1 | 7/2011 | Challinor et al. |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0013493 A1 | 1/2012 | Kato |
| 2012/0021833 A1 | 1/2012 | Boch et al. |
| 2012/0052942 A1* | 3/2012 | Esaki et al. ............... 463/31 |
| 2012/0052947 A1 | 3/2012 | Yun |
| 2012/0063617 A1 | 3/2012 | Ramos |
| 2012/0069131 A1 | 3/2012 | Abelow |
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |
| 2013/0132837 A1* | 5/2013 | Mead et al. ............... 715/716 |

FOREIGN PATENT DOCUMENTS

| | | |
|---|---|---|
| AU | 200194329 | 10/2001 |
| AU | 2003285918 | 5/2004 |
| AU | 2010229693 A1 | 11/2011 |
| CA | 2587415 A1 | 5/2005 |
| CA | 2609587 A1 | 12/2005 |
| CA | 2720723 A1 | 11/2009 |
| CA | 2757238 A1 | 9/2010 |
| CA | 2760210 A1 | 12/2010 |
| DE | 19716937 A1 | 3/1998 |
| DE | 69804915 T2 | 5/2002 |
| DE | 69726507 T2 | 11/2004 |
| DE | 69832379 T2 | 8/2006 |
| DE | 69739885 | 7/2010 |
| EP | 0903169 A2 | 3/1999 |
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A2 | 4/2001 |
| EP | 1 096 468 A2 | 5/2001 |
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |
| EP | 1132889 A2 | 9/2001 |
| EP | 1134723 A2 | 9/2001 |
| EP | 1136107 A2 | 9/2001 |
| EP | 1138357 A1 | 10/2001 |
| EP | 1139293 A2 | 10/2001 |
| EP | 1145744 A2 | 10/2001 |
| EP | 1145745 A2 | 10/2001 |
| EP | 1145748 A2 | 10/2001 |
| EP | 1145749 A2 | 10/2001 |
| EP | 1150276 A2 | 10/2001 |
| EP | 1151770 A2 | 11/2001 |
| EP | 1151773 A2 | 11/2001 |
| EP | 1157723 A2 | 11/2001 |
| EP | 1159992 A2 | 12/2001 |
| EP | 1160762 A2 | 12/2001 |
| EP | 1161974 A2 | 12/2001 |
| EP | 1 174 856 A2 | 1/2002 |
| EP | 1170041 A2 | 1/2002 |
| EP | 1178427 A1 | 2/2002 |
| EP | 1184061 A1 | 3/2002 |
| EP | 1187427 A2 | 3/2002 |
| EP | 1192976 A2 | 4/2002 |

(56) References Cited

FOREIGN PATENT DOCUMENTS

| | | |
|---|---|---|
| EP | 1195721 A2 | 4/2002 |
| EP | 1197947 A2 | 4/2002 |
| EP | 1199702 A2 | 4/2002 |
| EP | 1199703 A2 | 4/2002 |
| EP | 1 201 277 A2 | 5/2002 |
| EP | 1206950 A2 | 5/2002 |
| EP | 1208885 A1 | 5/2002 |
| EP | 1214959 A2 | 6/2002 |
| EP | 1220539 A2 | 7/2002 |
| EP | 1228794 A2 | 8/2002 |
| EP | 1245255 A2 | 10/2002 |
| EP | 1249260 A2 | 10/2002 |
| EP | 1258274 A2 | 11/2002 |
| EP | 1264622 A2 | 12/2002 |
| EP | 1270049 A2 | 1/2003 |
| EP | 1270050 A2 | 1/2003 |
| EP | 1271294 A2 | 1/2003 |
| EP | 1279425 A2 | 1/2003 |
| EP | 1287864 A2 | 3/2003 |
| EP | 1306112 A1 | 5/2003 |
| EP | 1413340 A1 | 4/2004 |
| EP | 000181482-0005 | 9/2004 |
| EP | 1503365 A1 | 2/2005 |
| EP | 1533010 A1 | 5/2005 |
| EP | 1542132 A1 | 6/2005 |
| EP | 1552864 A1 | 7/2005 |
| EP | 1552865 A1 | 7/2005 |
| EP | 1569171 A1 | 8/2005 |
| EP | 1604711 A1 | 12/2005 |
| EP | 1609513 A1 | 12/2005 |
| EP | 1630746 A1 | 3/2006 |
| EP | 1666109 A1 | 6/2006 |
| EP | 1696385 A2 | 8/2006 |
| EP | 1699017 A2 | 9/2006 |
| EP | 1731204 A1 | 12/2006 |
| EP | 1743680 A1 | 1/2007 |
| EP | 1 758 387 A1 | 2/2007 |
| EP | 1 825 896 A1 | 8/2007 |
| EP | 000859418-0008 | 2/2008 |
| EP | 000890447-0040 | 4/2008 |
| EP | 000890447-0046 | 4/2008 |
| EP | 2000190 A2 | 12/2008 |
| EP | 2001569 A2 | 12/2008 |
| EP | 2027577 A1 | 2/2009 |
| EP | 2206539 A1 | 7/2010 |
| EP | 2206540 A1 | 7/2010 |
| EP | 2301253 A1 | 3/2011 |
| EP | 2411101 A2 | 2/2012 |
| EP | 2494432 A2 | 9/2012 |
| FI | 200705530 | 1/2009 |
| FI | 20096276 | 12/2009 |
| GB | 2118809 A | 11/1983 |
| GB | 2425730 A | 11/2006 |
| GB | 2465918 A | 6/2010 |
| GB | 2471871 A | 1/2011 |
| HK | 1018021 A1 | 10/2002 |
| HK | 1023734 A1 | 2/2006 |
| IT | IN01685CN201 | 1/2012 |
| JP | 7185131 A | 7/1995 |
| JP | 3014386 B1 | 8/1995 |
| JP | 2552427 Y2 | 11/1996 |
| JP | 11053563 A | 2/1999 |
| JP | 11128534 A | 5/1999 |
| JP | 11128535 A | 5/1999 |
| JP | 11151380 A | 6/1999 |
| JP | 11156054 A | 6/1999 |
| JP | 2922509 | 7/1999 |
| JP | 11219443 A | 8/1999 |
| JP | 2951948 B1 | 9/1999 |
| JP | 2982147 B1 | 11/1999 |
| JP | 11313979 A | 11/1999 |
| JP | 3003851 U | 1/2000 |
| JP | 2000014931 | 1/2000 |
| JP | 2000037490 | 2/2000 |
| JP | 301798 B1 | 3/2000 |
| JP | 3031676 B1 | 4/2000 |
| JP | 2000107447 A | 4/2000 |
| JP | 2000107458 | 4/2000 |
| JP | 2000112485 A | 4/2000 |
| JP | 2000116938 A | 4/2000 |
| JP | 3053090 B1 | 6/2000 |
| JP | 2000157723 | 6/2000 |
| JP | 3066528 U | 7/2000 |
| JP | 2000218046 | 8/2000 |
| JP | 2000237454 A | 9/2000 |
| JP | 2000237455 A | 9/2000 |
| JP | 2000245957 | 9/2000 |
| JP | 2000245964 A | 9/2000 |
| JP | 2000245967 | 9/2000 |
| JP | 2000250534 | 9/2000 |
| JP | 2000/288254 | 10/2000 |
| JP | 2000293292 A | 10/2000 |
| JP | 2000293294 A | 10/2000 |
| JP | 2000300838 A | 10/2000 |
| JP | 2000300851 A | 10/2000 |
| JP | 2000308759 A | 11/2000 |
| JP | 2000317144 A | 11/2000 |
| JP | 2000325665 A | 11/2000 |
| JP | 2000350861 A | 12/2000 |
| JP | 2001000610 A | 1/2001 |
| JP | 2001009149 A | 1/2001 |
| JP | 2001009152 A | 1/2001 |
| JP | 2001009157 A | 1/2001 |
| JP | 2001046739 A | 2/2001 |
| JP | 2001062144 A | 3/2001 |
| JP | 2001070637 A | 3/2001 |
| JP | 2001070640 A | 3/2001 |
| JP | 2001070652 A | 3/2001 |
| JP | 2001075579 A | 3/2001 |
| JP | 2001096059 A | 4/2001 |
| JP | 2001096061 A | 4/2001 |
| JP | 2001129244 A | 5/2001 |
| JP | 2001145777 A | 5/2001 |
| JP | 2001145778 A | 5/2001 |
| JP | 3179769 B2 | 6/2001 |
| JP | 2001162049 A | 6/2001 |
| JP | 2001170352 A | 6/2001 |
| JP | 2001175254 A | 6/2001 |
| JP | 3187758 B2 | 7/2001 |
| JP | 2001190834 A | 7/2001 |
| JP | 2001190835 A | 7/2001 |
| JP | 2001190844 A | 7/2001 |
| JP | 2001198351 A | 7/2001 |
| JP | 2001198352 A | 7/2001 |
| JP | 2001198354 A | 7/2001 |
| JP | 3202733 B2 | 8/2001 |
| JP | 2001212369 A | 8/2001 |
| JP | 2001218980 A | 8/2001 |
| JP | 2001222280 A | 8/2001 |
| JP | 2001224850 A | 8/2001 |
| JP | 2001231904 A | 8/2001 |
| JP | 2001232059 A | 8/2001 |
| JP | 2001232062 A | 8/2001 |
| JP | 2001-252470 | 9/2001 |
| JP | 3204652 B2 | 9/2001 |
| JP | 2001252467 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 A | 12/2001 |
| JP | 3245139 B2 | 1/2002 |
| JP | 2002000936 A | 1/2002 |
| JP | 2002018123 A | 1/2002 |
| JP | 2002018134 A | 1/2002 |
| JP | 2002028368 A | 1/2002 |

(56) References Cited

FOREIGN PATENT DOCUMENTS

| | | |
|---|---|---|
| JP | 3258647 B2 | 2/2002 |
| JP | 3261110 B2 | 2/2002 |
| JP | 2002045567 A | 2/2002 |
| JP | 2002056340 A | 2/2002 |
| JP | 2002066127 A | 3/2002 |
| JP | 2002066128 A | 3/2002 |
| JP | 2002084292 A | 3/2002 |
| JP | 3270928 B2 | 4/2002 |
| JP | 2002116752 A | 4/2002 |
| JP | 2002140727 A | 5/2002 |
| JP | 2002143567 A | 5/2002 |
| JP | 2002153673 A | 5/2002 |
| JP | 3306021 B2 | 7/2002 |
| JP | 2002204426 A | 7/2002 |
| JP | 3310257 B2 | 8/2002 |
| JP | 3317686 B2 | 8/2002 |
| JP | 3317956 B2 | 8/2002 |
| JP | 2002224435 A | 8/2002 |
| JP | 2002239223 A | 8/2002 |
| JP | 2002239233 A | 8/2002 |
| JP | 3320700 B2 | 9/2002 |
| JP | 3321111 B2 | 9/2002 |
| JP | 2002263229 A | 9/2002 |
| JP | 3333773 B2 | 10/2002 |
| JP | 3338005 B2 | 10/2002 |
| JP | 2002282417 A | 10/2002 |
| JP | 2002282418 A | 10/2002 |
| JP | 2002292123 A | 10/2002 |
| JP | 2002292139 A | 10/2002 |
| JP | 2002301263 A | 10/2002 |
| JP | 3345719 B2 | 11/2002 |
| JP | 2002325975 A | 11/2002 |
| JP | 3351780 B2 | 12/2002 |
| JP | 2002360937 A | 12/2002 |
| JP | 3361084 B2 | 1/2003 |
| JP | 3370313 B2 | 1/2003 |
| JP | 3371132 B2 | 1/2003 |
| JP | 2003000951 A | 1/2003 |
| JP | 2003010541 A | 1/2003 |
| JP | 2003010542 A | 1/2003 |
| JP | 2003019346 A | 1/2003 |
| JP | 2003030686 A | 1/2003 |
| JP | 2003058317 A | 2/2003 |
| JP | 3392833 B2 | 3/2003 |
| JP | 2003117233 A | 4/2003 |
| JP | 2003126548 A | 5/2003 |
| JP | 3417555 B2 | 6/2003 |
| JP | 3417918 B2 | 6/2003 |
| JP | 3420221 B2 | 6/2003 |
| JP | 2003175279 A | 6/2003 |
| JP | 3425548 B2 | 7/2003 |
| JP | 3425552 B2 | 7/2003 |
| JP | 3433918 B2 | 8/2003 |
| JP | 3439187 B2 | 8/2003 |
| JP | 2003236244 A | 8/2003 |
| JP | 3442730 B2 | 9/2003 |
| JP | 3448043 B2 | 9/2003 |
| JP | 2003256552 A | 9/2003 |
| JP | 3458090 B2 | 10/2003 |
| JP | 3470119 B2 | 11/2003 |
| JP | 2003334387 A | 11/2003 |
| JP | 3491759 B1 | 1/2004 |
| JP | 2004016315 A | 1/2004 |
| JP | 2004016388 A | 1/2004 |
| JP | 3496874 B2 | 2/2004 |
| JP | 3500379 B1 | 2/2004 |
| JP | 3500383 B1 | 2/2004 |
| JP | 2004033266 A | 2/2004 |
| JP | 2004097610 A | 4/2004 |
| JP | 2004105309 A | 4/2004 |
| JP | 2004121397 A | 4/2004 |
| JP | 3526302 B1 | 5/2004 |
| JP | 2004141261 A | 5/2004 |
| JP | 3534345 B1 | 6/2004 |
| JP | 2004164519 A | 6/2004 |
| JP | 2004166994 A | 6/2004 |
| JP | 3545755 B2 | 7/2004 |
| JP | 3545983 B2 | 7/2004 |
| JP | 3546206 B2 | 7/2004 |
| JP | 3547374 B2 | 7/2004 |
| JP | 2004192069 A | 7/2004 |
| JP | 2004201937 A | 7/2004 |
| JP | 3561456 B2 | 9/2004 |
| JP | 3566195 B2 | 9/2004 |
| JP | 3573288 B2 | 10/2004 |
| JP | 3576994 B2 | 10/2004 |
| JP | 3582716 B2 | 10/2004 |
| JP | 2004283249 A | 10/2004 |
| JP | 2004298469 A | 10/2004 |
| JP | 2004321245 A | 11/2004 |
| JP | 3597465 B2 | 12/2004 |
| JP | 2004337256 A | 12/2004 |
| JP | 3611807 B2 | 1/2005 |
| JP | 2005046445 A | 2/2005 |
| JP | 2005049913 A | 2/2005 |
| JP | 3626711 B2 | 3/2005 |
| JP | 3634273 B2 | 3/2005 |
| JP | 2005095440 A | 4/2005 |
| JP | 3656118 B2 | 6/2005 |
| JP | 3686906 B2 | 8/2005 |
| JP | 3699660 B2 | 9/2005 |
| JP | 2005261586 A | 9/2005 |
| JP | 3702269 B2 | 10/2005 |
| JP | 2005287830 A | 10/2005 |
| JP | 2005301578 A | 10/2005 |
| JP | 3715513 B2 | 11/2005 |
| JP | 2005319025 A | 11/2005 |
| JP | 2006020758 A | 1/2006 |
| JP | 3753425 B2 | 3/2006 |
| JP | 2006075264 A | 3/2006 |
| JP | 2006116046 A | 5/2006 |
| JP | 2006116047 A | 5/2006 |
| JP | 2006192157 A | 7/2006 |
| JP | 3804939 B2 | 8/2006 |
| JP | 3816931 B2 | 8/2006 |
| JP | 3822887 B2 | 9/2006 |
| JP | 3831695 B2 | 10/2006 |
| JP | 3869175 B2 | 1/2007 |
| JP | 2007029589 A | 2/2007 |
| JP | 3890445 B2 | 3/2007 |
| JP | 2007504901 A | 3/2007 |
| JP | 2008018287 A | 1/2008 |
| JP | 2008168143 A | 7/2008 |
| JP | 2009531153 A | 9/2009 |
| JP | 2010509000 A | 3/2010 |
| KR | 20010027533 A | 4/2001 |
| KR | 20050047024 A | 5/2005 |
| RU | 2010146213 A | 5/2012 |
| SG | 173496 A1 | 9/2011 |
| TW | 340049 | 3/2009 |
| TW | 200951764 A | 12/2009 |
| TW | 201006526 A | 2/2010 |
| TW | 322023 | 3/2010 |
| TW | 201116318 A | 5/2011 |
| WO | WO-9717598 A1 | 5/1997 |
| WO | WO-9938588 A1 | 8/1999 |
| WO | WO-01/63592 A2 | 8/2001 |
| WO | WO-0163592 | 8/2001 |
| WO | WO-0230535 A1 | 4/2002 |
| WO | WO-200402590 A1 | 1/2004 |
| WO | WO-200402594 A1 | 1/2004 |
| WO | WO-200424256 A1 | 3/2004 |
| WO | WO-200424263 A1 | 3/2004 |
| WO | WO-200427631 A1 | 4/2004 |
| WO | WO-200430779 A1 | 4/2004 |
| WO | WO-2004039055 A2 | 5/2004 |
| WO | WO-200453800 A1 | 6/2004 |
| WO | WO-2004052483 A1 | 6/2004 |
| WO | WO-200482786 A1 | 9/2004 |
| WO | WO-200487272 A1 | 10/2004 |
| WO | WO-2004107270 A1 | 12/2004 |
| WO | WO-2005027062 A1 | 3/2005 |
| WO | WO-2005027063 A1 | 3/2005 |
| WO | WO-2005030354 A1 | 4/2005 |

(56) References Cited

FOREIGN PATENT DOCUMENTS

| | | |
|---|---|---|
| WO | WO-2005039212 A1 | 4/2005 |
| WO | WO-2005099842 A1 | 10/2005 |
| WO | WO-2005107902 A1 | 11/2005 |
| WO | WO-2005/113096 A1 | 12/2005 |
| WO | WO-2005114648 A1 | 12/2005 |
| WO | WO-2006006274 A1 | 1/2006 |
| WO | WO-2006075494 A1 | 7/2006 |
| WO | WO-2007/055522 A1 | 5/2007 |
| WO | WO-2007070738 A2 | 6/2007 |
| WO | WO-2007078639 | 7/2007 |
| WO | WO-2007/115299 A2 | 10/2007 |
| WO | WO-2007111247 A1 | 10/2007 |
| WO | WO-2007130582 A2 | 11/2007 |
| WO | WO-2008001088 A2 | 1/2008 |
| WO | WO-2008145952 A1 | 12/2008 |
| WO | WO-2009021124 A2 | 2/2009 |
| WO | WO-2010018485 A1 | 2/2010 |
| WO | WO-2010036989 A1 | 4/2010 |
| WO | WO-2011067469 A1 | 6/2011 |
| WO | WO-2011155958 A1 | 12/2011 |

OTHER PUBLICATIONS

Amplitude Review by Ryan Davis. Retrieved from the Internet: www.gamespot.com/ps2/puzzle/ampli~de /printable_6023980.html. Retrieved on Jun. 11, 2012. 10 pages.

Amplitude. Retrieved from the Internet: www.gamesquestdirect.com/71171972582.htrnl. Retrieved on Jun. 8, 2012. 2 pages.

Amplitude: Sony's Rocking Rhythm Game Outdoes Itself on All Fronts by Douglass C. Perry. Retrieved from the Internet: http://ps2.ign.com/articles/390/390620pl.thml. Retrieved on Jun. 8, 2012. 6 pages.

Association of British Scrabble Players. "Rolling System" ABSP, http://www.absp.org.uk/results/ratings_detail.shtml. Retrieved May 25, 2011 (4 pages).

Beat Planet Music (Import) Review by Christian Nutt. Retrieved from the Internet: www.gamespot.com/ps/ action/beatplanetmusiclprintable_2546762.html. Retrieved on Jun. 11, 2012. 3 pages.

Beatmania IIDX 9 Style. Retrieved from the Internet: www.play-asia.com/paOS-13-71-8-iu.html. Retrieved on Feb. 22 2005. 2 pages.

Beatmania PlayStation Review from www.GamePro.com/sony/psx/games/reviews/89.shtml. Retrieved on Feb. 22, 2005. 1 page.

Beatmania Review. Retrieved from the Internet: www.gamesarefun.com/gamesdb/review.h?reviewid=294. Retrieved on Jun. 11, 2012. 1 page.

Beatmanla IIDX 7 Style. Retrieved from the Internet: www.lik-sang.com/Info.php?category=27&products id=4061. Retrieved on Feb. 22 2005. 1 page.

Bishop, Sam; Frequency: If you decide to pick up this game, you better give up ont he idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.

Bust A Groove Review by Jeff Gerstmann. Retrieved from the Internet: www.gamespolcom/ps/puzzlebusta groove/printable_2546923.html. Retrieved on Jun. 11, 2012. 9 pages.

Bust A Groove. Retrieved from the Internet: www.buyritegames.com/product_information. asp?rc=frgl&number=PS-BUSTA2. Retrieved on Feb. 22, 2005. 1 page.

Bust A Groove. Retrieved from the Internet: www.estarland.com/index.asp?page=Piaystation&cat=F&oroduct=6257&q. Retrieved on Jun. 11, 2012. 2 pages.

Bust A Groove: 989 Studios Best Game of the Year is a Funky Dance Sim thars Got the Fever by Doug Peny. Retrieved from the Internet http://psx.com/articles/152/152308pl.html. Retrieved on Jun. 8, 2012. 5 pages.

BVH File Specification, Character Studio, http://lweb.archive.org/web/20060321075406/http:/lcharacterstudio. neUbvh file specification.htm, Mar. 21, 2006 (16 pages).

Dance Dance Revolution Review by Andy Chien. Retrieved from the Internet www.gamingage.com/reviews /archive/old reviews/psx/ddr. Retrieved on Feb. 22 2005. 3 pages.

Dance Dance Revolution Review by Ryan Davis. Retrieved from the Internet www.gamespolcom/ps/puzzJe /dancedancerevolutionfprintable_2699724.html. Retrieved on Jun. 11, 2012. 9 pages.

Dance Dance Revolution, Konami via wvvw.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.

Dance Dance Revolution. Retrieved from the Internet: www.ebgames.com/ebxlproduct/224 789.asp. Retrieved on Feb. 22, 2005. 2 pages.

Dave H, et al. StepMania Tutorial. Nov. 3, 2004. <http://web.archive.org/web/200411031145A/vww.stepmania.conVstepmania/wiki.php?pagename=Tutorial>. Retrieved on Jun. 19, 2012. 7 pages.

Def Jam Vendetta Review by Alex Navarro. Retrieved from the Internet www.gamespot.com/ps2/actionf actionfdefjamvendetta/prIntable_6024297 .html. Retrieved on Jun. 11, 2012. 10 pages.

Def Jam Vendetta. Retrieved from the Internet www.ebgames.com/ebxlproduct/232378.asp. Retrieved on Feb. 22, 2005. 2 pages.

Def Jam Vendetta: Rapper's Delight or Fight-Night Fright? Smash Sumthin' and Find Out by Jon Robinson. Mar. 31, 2003. Retrieved from the Internet http://ps2.ign.com/articles/391/391713p1.html. Retrieved on Jun. 8, 2012. 6 pages.

Digital Play: Reloaded. Opening Reception. Museum of the Moving Image. Mar. 19, 2005. <http://web.archive.Org/web/20050319060247/http://www.movingimage.us/site/screenings/contenV2005/digital_play_reloaded.ht ml>. 1 page.

Donkey Konga Review by Ryan Davis. Retrieved from the Internet: www.gamespot.com/gamecubelpuzzle/ donkeykonga/printable_6108977.html. Retrieved on Jun. 11, 2012. 11 pages.

Donkey Konga. Retrieved from the Internet: www.ebgames.com/ebxlproducV244024.asp. Retrieved on Jun. 11, 2012. 2 pages.

Donkey Konga: Could a Game Featuring Donkey Kong and Mini-Bongos ever Fail? Our Ful Review by Juan Castro. Retrieved from the Internet: cube.ign.com/articles/550/550723pl.html. Retrieved on Jun. 8, 2012. 6 pages.

DrumMana w/ Drum Set. Retrieved from the Internet www.estarland.com/index.asp?page=Playstation2&cat=RD&product=181268 &q. Retrieved on Jun. 11, 2012. 2 pages.

DrumMania (Import) Review by Jeff Garstmann. Retrieved from the Internet: www.gamespot.com/ps2/actionf drummania/prinlable_2546356.html. Retrieved on Jun. 11, 2012. 9 pages.

DrumMania OST. Retrieved from the Internet www.lik-sang.corn/info/php?category=264&products id=4793. Retrieved on Feb. 22, 2005. 2 pages.

DrumMania Review by Wynfwad. Retrieved from the Internet www.gamefaqs.com/console/ps2/review/ R56573.html. Retrieved on Jun. 11, 2012. 2 pages.

ESRB Game Ratings: Game Rating & Descriptor Guide' via www.esrb.org[online], Retrived from the Internet: <URL: http:/Arvww.esrb.org/esrbratings_guide.asp#symbols>. Retrieved on Jun. 14, 2012. 3 pages.

Eye Toy Groove with Camera (Playstation 2). Retrieved from the Internet www.jr.com/JR ProductPage.process?Product Code=PS2+97400&JRSource=google. Retrieved on Feb. 22, 2005. 1 page.

Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.

Eye Toy: Groove—The Little Camera That Could comes Back with a Few New Tricks by Ed Lewis. Retrieved from the Internet: htiAy/ps2.ign.corn/artjcles/507/507854pl.html. Retrieved on Jun. 8, 2012. 8 pages.

Eye Toy: Groove Review by Ryan Davis. Retrieved from the Internet: wvm.gamespot.com/ps2/puzzle/ eyetoygroove/printable_6094754.html. Retrieved on Jun. 11, 2012. 10 pages.

Frequency—Pre-Played. Retrieved from the Internet www.ebgames.com/ebx/product/203370.asp. Retrieved on Feb. 22, 2005. 2 pages.

(56) References Cited

OTHER PUBLICATIONS

Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producL.gsp7dests9999999997&product id=1635738&s. Retrieved on Feb. 22, 2005. 2 pages.
Frequency Review by Ryan Davis. Retrieved from the Internet:www.gamespot.com/ps2/ puzzle/frequency/ printable 2827476.html. Retrieved on Jun. 19, 2012. 9 pages.
Get on Da Mic Overview by Matt Gonzales. Retrieved from the Internet www.gamechronides.com/reviews/ ps2/getondamic/body.htm. Retrieved on Jun. 11, 2012. 3 pages.
Get on Da Mic Review by Jeff Gerstmann. Retrieved from the Internet wvw.gamespot.cx)rri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estartand.com/index.asp?page=Piaystation2 &cat=PZ&product=676&Q .. Retrieved on Jun. 14, 2012. 2 pages.
Gitaroo-Man Review by David Smith. Retrieved from the Internet htt£-yΛs2.ign.conVara'c!es/354/ 354413pjLhtml. Retrieved on Jun. 11, 2012. 4 pages.
Gitaroo-Man Review by Ryan Davis. Retrieved from the Internet:www.gamesrx)t.coiTi/ps2/puzzle/gitaroomart/printable 2847915.html. Retrieved on Jun. 19, 2012. 9 pages.
Gitaroo-Man. Retrieved from the Internet vvvrw.buyritegames.com/productjnformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/ guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_information.asp?rc=frgl&number= PSJ-GUiIWG. Retrieved on Feb. 22, 2005. 1 page.
Guitar Hero (video game)—Wikipedia, the free encyclopedia—(Publisher—RedOctane) Release Date Nov. 2005. 25 pages.
Guitar Hero—Wikipedia, the free encyclopedia—Nov. 2005. http://en.wikipedia.org/w/index.php?title=guitaryhero&oldid= 137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.
International Search Report, PCT/US2006/062287, Mailed on May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet www.gamespot.com/ps2/puzzle/ karaokerevolution/printable ... 6081709.html. Retrieved on Jun. 14, 2012. 10 pages.
Karaoke Revolution. Retrieved from the Internet: www.ebgames.com/ebxlproduct/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 11, 2012. 7 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.
Mad Maestro! by Ryan Davis. Retrieved from the Internet: www.gamespot.com/ps2/puzzle.madmaestro/ printable_2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 11, 2012. 6 pages.
Mojib Ribbon Playtest by Anoop Gantayat. Retrieved from the Internet: htto://os2.ion.com/articles/442/442204p1.html. Retrieved on Jun. 11, 2012. 4 pages.
Mojib Ribbon—Review. Retrieved from the Internet: www.ntsc-uk.com/review.php?platform=ps2&game=MoiibRibbon. Retrieved on Jun. 14, 2012. 2 pages.
Mojib Ribbon. Retrieved from the Internet: www.lik-sang.comlInfo.php?category=27&products id=3805&PHPSESSID=b9eQca. Retrieved on Feb. 22, 2005. 1 page.
Mojib Ribbon. Retrieved from the Internet: www.ncsxshop.com/cgi-bin/shop/SCPS.11033.html. Retrieved on Jun. 14, 2012. 2 pages.
NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).
Non-Final Office Action as issued by The United States Patent and Trademark Office for U.S. Appl. No. 12/474,899, dated Jan. 19, 2011, 7 pages.
PaRappa the Rapper 2. Retrieved from the Internet:wvAV.amazon.eom/exedobidos/tg/deteil/-/B00005UNWD/ 104-4695527-8827110. Retrieved on Feb. 22, 2005. 2 pages.
PaRappa The Rapper Review by Jer Horwitz. Retrieved from the Internet: www.gamespot.com/pslpuzzlel parappatherapper/printable_2548866.html. Retrieved on Jun. 14, 2012. 9 pages.
Parappa the Rapper. Retrieved from the Internet: wvvw.estariand.com/index.asp?page=Playstation&cat=F&product=6871&q. Retrieved on Jun. 11, 2012. 2 pages.
Parappa the Rapper: PaRapper the Rapper Is finally here, but does it live up to the hype? by Adam Douglas. Retrieved from the Internet http://psx.ign.com/articlesl150/150490p1.html. Retrieved on Jun. 11, 2012. 2 pages.
PopCap Games Site Review via www.download-free-games.com, retrieved on Mar. 2, 2006. Retrieved from the Internet <URL:http7Avww.download-free-games.com/reviews/popcap_games.htm>. 2 pages.
Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.
RedOctane. "Guitar Hero 2 Manual" Activision Publishing, Inc. (2006) (13 pages).
Rez PlayStationΛ. Retrieved from the internet: http://global.yesasia.com/en/PrdDept.aspx/ pjd-1002847668. Retrieved on Jun. 14, 2012. 1 page.
Rez Review by Jeff Gerstmann. Retrieved from the Internet:www.qamespot.com/ps2/action/ rez/printable 2838815.html. Retrieved on Jun. 11, 2012. 9 pages.
Rez. Retrieved from the Internet: vvww.estartand.a)rn/index.asp?page=Pfaystation2c\cat=RD&product=5426&q. Retrieved on Jun. 14, 2012. 2 pages.
Rez: You May Not Understand This Review. We May Not Either. But you should certainly play this game by.David Smith. Retrieved from the Internet: httpΛ/ps2.ign.corru'artides/166/166546p1.html. Retrieved on Jun. 11, 2012.3 pages.
SingStar Party (SingStar2) Bundle. Retrieved from the Internet: www.gameswarehouse.com. Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId= 10001&langId. Retrieved on Feb. 22, 2005. 1 page.
SingStar Review (PS2) by James Hamer-Mortonl. Retrieved from the Internet http://ps2.twomtown.net/en uk/articles/ art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.

(56) References Cited

OTHER PUBLICATIONS

Space Channel 5 Special Edition Review by Brad Shoemaker. Retrieved from the Internet: www.gamespot.corn/ps2/puzzle/spacecriannel5pait2/printeble_6085137.h Retrieved on Jun. 11, 2012. 10 pages.

Space Channel 5. Retrieved from the Internet: www.lik-sang.com/info.php?products_is=2050 &likref=fro_gle4. Retrieved on Feb. 22, 2005. 1 page.

Space Channel 5: Description. Retrieved from the Internet: www.buyritegames.com/product_information.asp?rc=frgl&number=DC-SPACEC5. Retrieved on Feb. 22, 2005. 1 page.

Space Channel 5: Special Edition by Jason Thompson. Retrieved from the Internet www.popmattere.corn/ mulumerJia/reviews/s/space-channel-5.shtml. Retrieved on Jun. 8, 2012. 2 pages.

Taiko Drum Master Review by Justin Calvert. Retrieved from the Internet: www.gamespot.com/ps2 puzzie/taikodrummaster/printable_6111767.html. Retrieved on Jun. 14, 2012. 10 pages.

Taiko Drum Master w/ Drum. Retrieved from the Internet: www.ebgames.com/ebx/product/ 244015.asp. Retrieved on Jun. 14, 2012. 2 pages.

Taiko no Tatsujin. Retrieved from the Internet htlpy/games.channel.aol.com/review.adp?qameID-7569. Retrieved on Feb. 22, 2005. 3 pages.

Vib Ribbon (PSX): Homepage, Screenshots by James Anthony. http://www.vib-ribbon.com/vibhtml/english/index.html. Retrieved on Jun. 14, 2012. 1 page.

Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.

Vib-Ribbon. Retrieved from the Internet: www.ncsxshop.com/cgi-bin/shop/SCPS-45469.html. Retrieved on Feb. 22, 2005. 1 page.

Video MJ the Experience Kinect: release Apr. 2011, http//www.youtube.com/watch?v=N7oyxH I P48A.

Video 'Ghosts' Gameplay Trailer: <http://www.gametrailers.com/video/ghosts-gameplay-michaeljackson/ 706825>_(Oct. 27, 2010).

Video <http://www.bing.com/videos/search?q=dance+instruction+game&mid=E69356CFA 1B6719FF 5C8E69356CFA1B6719FF5C8&view=detaii&FORM=VIRE5> (uploaded Jul. 27, 2010).

Video Britney's Dance Beat (Released May 8, 2002 for PS2); <http://www. youtube.com/watch?v=-KR 1 dR GNX w>.

Video Dance Dance Revolution: Hottest Party 3 (Released Sep. 27, 2009 for Wii) <http://www.youtube.com/watch?v=zk20hEzGmUY>.

Video Dance on Broadway- Ubisoft, Longtail Studios; <http://www.youtube.comiwatch?v='eYaPdT4z-M>: (Jun. 6, 201Q1}_.

Video Dance on Broadway: Jun. 2010 (<http://youtu.be/Wi9Y5HHcvtY>).

Video Dance Summit 2001: Bust A Groove (Released Nov. 2, 2000 for PS2); <http://www.youtube.com/watch?v=E8NjTGHYQcM>.

Video Dancing With the Stars—Activision, Zoe Mode; <http://www.youtube.com/watch?v=C7zBVfEJO~:gp (Oct. 2007).

Video Dancing with the Stars: Oct. 2007 (http://www.youtube.com/watch?v=8UChG2v5DI).

Video Dancing with the Stars: We Dance- Activision, Zoe Mode; <http://www.youtube.com/watch?v=31GOb-CT8vs> (Oct. 2008).

Video DDR Hottest Party; <http://www.youtube.com/watch?v=zk20hEzGmUY> (Sep. 2007).

Video Don't Stop' Gameplay Trailer: <http://www.gametrailers.com/video/dont-stop-michaeljackson/ 707336> (Nov. 10, 2010).

Video Dream Dance & Cheer (Released Sep. 13, 2009 for Wii) <http://www.youtube.com/watch?v=oi9vQiT1x5Q>.

Video E3 2010 Live Demo <http://www.gametrailers.com/video/e3-201 0-michael-jackson/101449>; (Jun. 14, 2010).

Video Eyetoy Groove for PS2; <http://www.youtube.com/watch?v=c80aa0U fuE> (A(2ri12004).

Video Gamescom '1 0—Billie Jean Demo <http:/iwww.aarnetraiiHrs.corn/video/gc-•1 Q.. Michael-Jackson/703294>: 1:58-1 :13) (Aug. 20, 201 D).

Video Gamescom '10- Working Day and Night Demo <http://www.gametrailers.com/video/gc-1 0-michael-jackson/703295> (Aug. 20, 2010).

Video Grease Dance—505 Games: release—Oct. 2011 Ii_http://www.youtube.com/watch?v=PaGBHSB2urg).

Video Hannah Montana: Spotlight World Tour (Released Nov. 6, 2007 for Wii); <http://www.youtube.com/watch?v=WtyuU2NaL3Q>.

Virginia Tech Multimedia Music Dictionary: "P: Phrase" Virginia Tech University, http://www.music.vt.edu/musicdictionary/textp/Phrase.html. Retrieved May 25, 2011 (7 pages).

Beatnik Patent Sale Offering, Nov. 2008 (81 pp).

Boombox Icons, http://findicons.com/search/boombox, viewed on Jul. 31, 2012 copyright 2010 (1 page).

International Search Report issued for PCT/US2010/054300, dated May 31, 2011 (5 pages).

Kuwayama, Y. Trademarks & Symbols, vol. 2: Symbolical Designs, Van Nostrand Reinhold Company, (Nov. 4, 1980). 4 pages.

Microsoft Office Online Clip Art, http://office.microsoft.com/en-us/clipart/results.aspx?Scope=MC,MM,MP,MS&PoleAssetID=MCJ04316180000&Querty=lcons&CTT=6&Origin=EC01017435m (Feb. 21, 2007) (1 page).

Microsoft PowerPoint Handbook, (1 page) (1992).

"BVH File Specification", Character Studio, http://web.archive.org/web/20060321075406/http://character-studio.net/bvh_file_specification.htm, Mar. 21, 2006 (16 page).

MJ the Experience Kinect: release Apr. 2011, http//www.youtube.com/watch?v=N7oyxHIP48A.

'Don't Stop' Gameplay Trailer: <http://www.gametrailers.com/video/dont-stop-michael-jackson/707336> (Nov. 10, 2010).

'Ghosts' Gameplay Trailer: <http://www.gametrailers.com/video/ghosts-gameplay-michael-jackson/706825> (Oct. 27, 2010).

<http://www.bing.com/videos/search?q=dance+instruction+game&mid=E69356CFA1B6719FF5C8E69356CFA1B6719FF5C8&view=detail&FORM=VIRE5> (uploaded Jul. 27, 2010).

Alvin and the Chipmunks Chipwrecked—Majesco Sales: release—Nov. 2011 (http://www.youtube.com/watch?v=xKeW3CUt14A&feature=related).

Britney's Dance Beat (Released May 8, 2002 for PS2); <http://www.youtube.com/watch?v=-KR1dRGNX_w>.

Dance Dance Revolution: Hottest Party 3 (Released Sep. 27, 2009 for Wii) <http://www.youtube.com/watch?v=zk20hEzGmUY>.

Dance on Broadway—Ubisoft, Longtail Studios; <http://www.youtube.com/watch?v=eYaP-dT4z-M>; (Jun. 6, 2010).

Dance on Broadway: Jun. 2010 (http://youtu.be/Wi9Y5HHcvtY).

Dance Summit 2001: Bust a Groove (Released Nov. 2, 2000 for PS2); <http://www.youtube.com/watch?v=E8NjTGHYQcM>.

Dancing With the Stars—Activision, Zoe Mode; <http://www.youtube.com/watch?v=C7zBVfEJ0gg> (Oct. 2007).

Dancing with the Stars: Oct. 2007 (http://www.youtube.com/watch?v=8UChG2v5DI).

Dancing with the Stars: We Dance—Activision, Zoe Mode; <http://www.youtube.com/watch?v=31G0b-CT8vs> (Oct. 2008).

DDR Hottest Party; <http://www.youtube.com/watch?v=zk20hEzGmUY> (Sep. 2007).

Dream Dance & Cheer (Released Sep. 13, 2009 for Wii) <http://www.youtube.com/watch?v=oi9vQjT1x5Q>.

E3 2010 Live Demo <http://www.gametrailers.com/video/e3-2010-michael-jackson/101449>; (Jun. 14, 2010).

Eyetoy Groove for PS2; <http://www.youtube.com/watch?v=c80aaOU_fuE> (Apr. 2004).

Gamescom '10—Billie Jean Demo <http://www.gametrailers.com/video/gc-10-michael-jackson/703294>; (:58-1:13) (Aug. 20, 2010).

Gamescom '10—Working Day and Night Demo <http://www.gametrailers.com/video/gc-10-michael-jackson/703295> (Aug. 20, 2010).

Grease Dance—505 Games: release—Oct. 2011 (http://www.youtube.com/watch?v=PaGBHSB2urg).

Hannah Montana: Spotlight World Tour (Released Nov. 6, 2007 for Wii); <http://www.youtube.com/watch?v=WtyuU2NaL3Q>.

Just Dance—Ubisoft Paris; <http://www.youtube.com/watch?v=t7f22xQCEpY>; (Nov. 17, 2009).

(56) References Cited

OTHER PUBLICATIONS

Just Dance 2—Ubisoft; <http://www.youtube.com/watch?v=kpaW9sM_M2Q> (Oct. 12, 2010).

Just Dance 2: Oct. 2010 (http://youtu.be/2ChliUgqLtw).

Just Dance: Nov. 2009 (http://youtu.be/rgBo-JnwYBw).

Kidz Bop Dance Party! The Video Game (Released Sep. 14, 2010 on Wii) <http://www.youtube.com/watch?v=I8VD9EvFdeM>.

Let's Cheer—Take 2 Interactive: release—Nov. 2011; announce—Jun. 2011 (http://www.youtube.com/watch?v=uv1IMB1w2Dw&feature=related).

MJ the Experience Kinect: announce—Oct. 2010: (http://www.youtube.com/watch?v=xLbiPicu0MM).

MJ the Experience Wii: Nov. 2010 (http://www.youtube.com/watch?v=8ZA59JY8Y_w).

N.Y. Comic Con '10—Billie Jean Gameplay Demo: <http://www.qametrailers.com/video/nycc-10-michael-jackson/706056>; (Oct. 13, 2010).

Thalmann, "L'animation par ordinateur" http://web.archive.org/web/20060421045510/http://vrlab.epfl.ch/{thalmann/CG/infogr.4.pdf>, Apr. 21, 2006 (52 pages).

Tokyo Game Show '10—'Every Step' Trailer: http://www.gametrailers.com/video/tgs-10-michael-jackson/704548 (Sep. 15, 2010).

Victorious: Time to Shine—D3 publishers: Nov. 2011 announce: Sep. 2011 (http://www.youtube.com/watch?v=ud690K02KGg&feature=fvst).

We Cheer 2 (Released Nov. 3, 2009 for Wii) <http://www.youtube.com/watch?v=-4oalxqnbll>.

MJ:TE on Wii (Nov. 2010); http://www.youtube.com/watch?v=gmIMNGWxgvo.

MJ:TE Kinect from Aug. 19, 2010 at <http://www.youtube.com/watch?v=6AjGmSnN6gQ>; Michael Jackson the Experience Video Game—Kinect for Xbox 360—Gamescom 2010 HD.

"E3 2010 Live Demo", where Ubl talked about MJ:TE for Kinect (<http://www.gametrailers.com/video/e3-2010-michael-jackson/101449>).

MJ—Paris Week game demo—Oct. 29, 2010; http://www.dailymotion.com/video/xfg4oe_pgw-10-michael-jackson-experience-kinect_videogames?start=13#from=embed.

U.S. Appl. No. 12/913,493, filed Oct. 27, 2010 (69 pages).
U.S. Appl. No. 29/393,964, filed Jun. 10, 2011 (2 pages).
U.S. Appl. No. 29/393,967, filed Jun. 10, 2011 (2 pages).
U.S. Appl. No. 29/393,968, filed Jun. 10, 2011 (2 pages).
U.S. Appl. No. 29/393,970, filed Jun. 10, 2011 (2 pages).
U.S. Appl. No. 29/393,973, filed Jun. 10, 2011 (2 pages).
U.S. Appl. No. 29/393,975, filed Jun. 10, 2011 (2 pages).

* cited by examiner

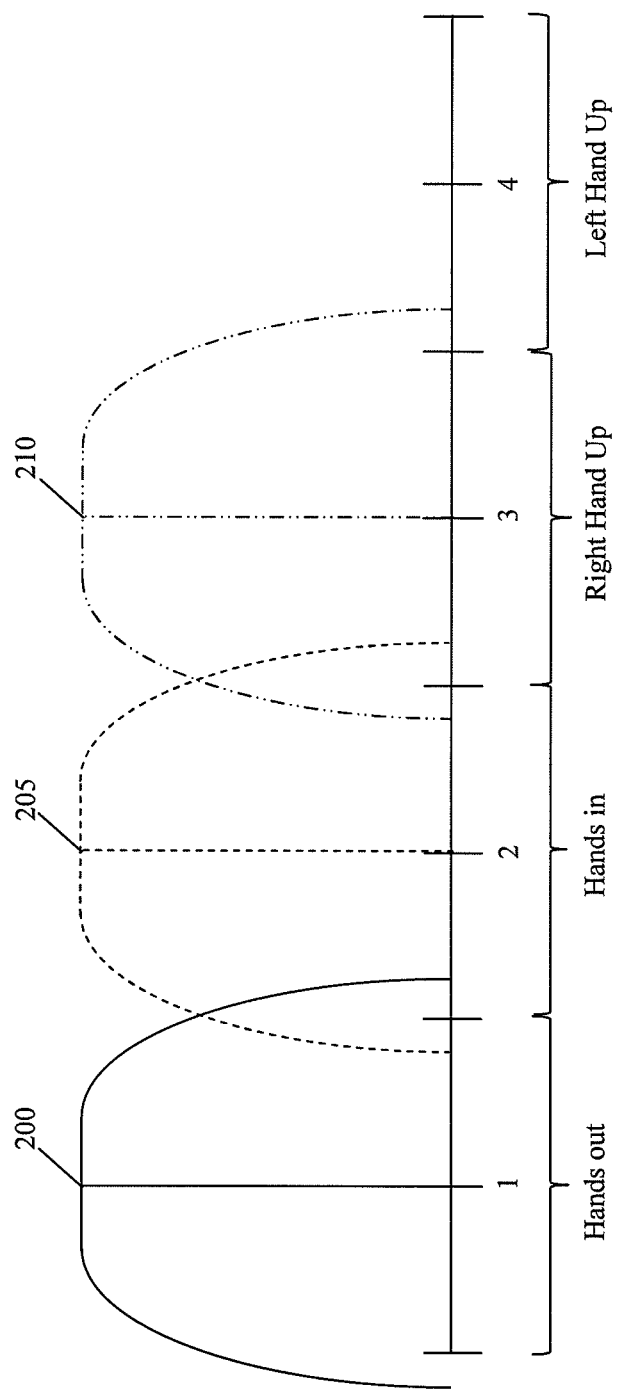

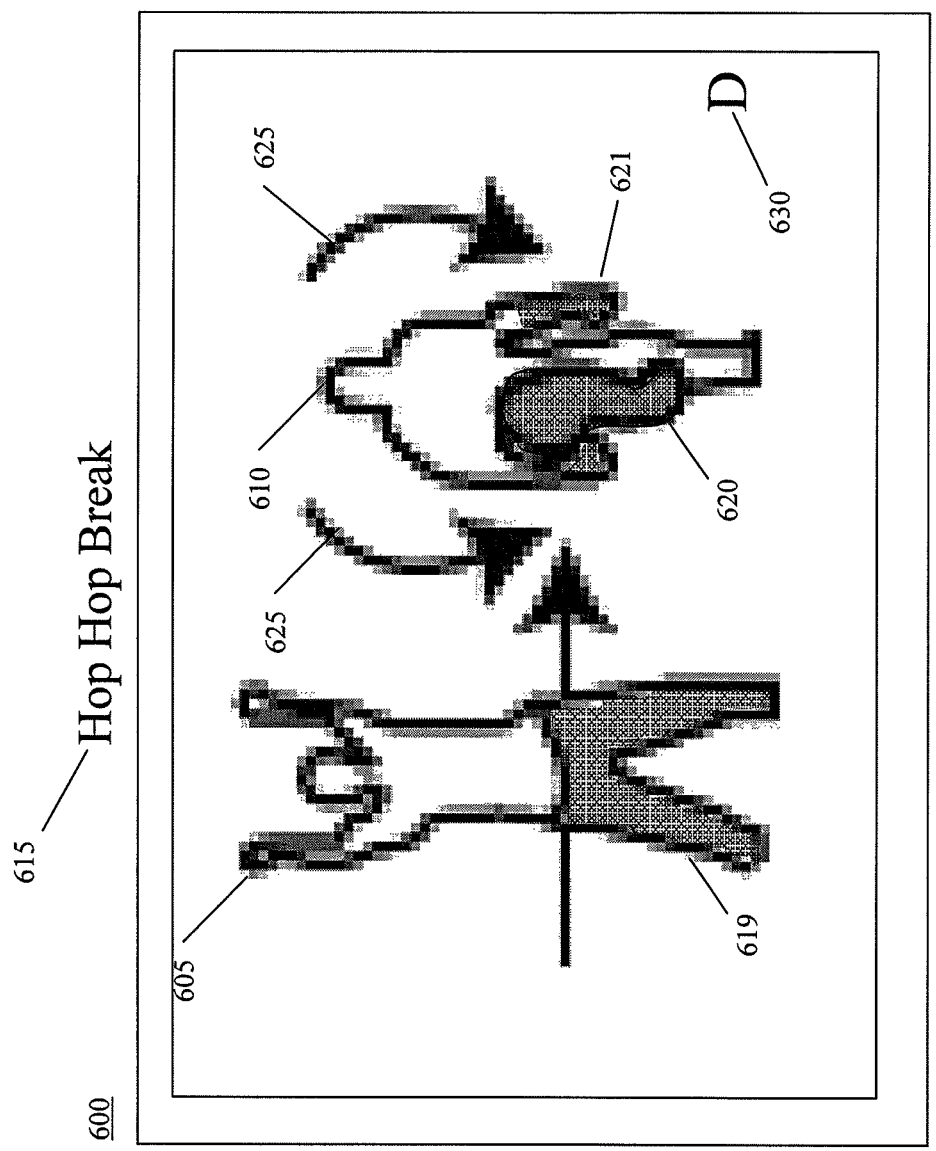

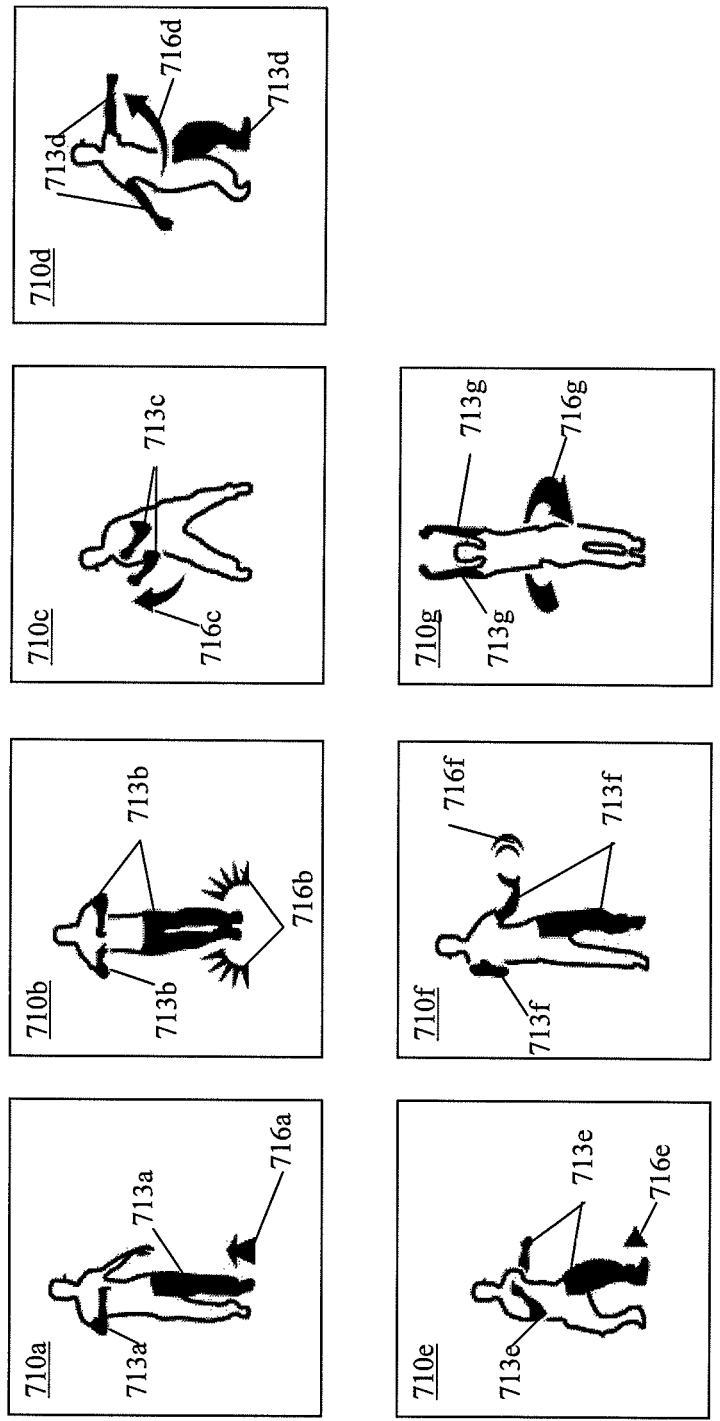

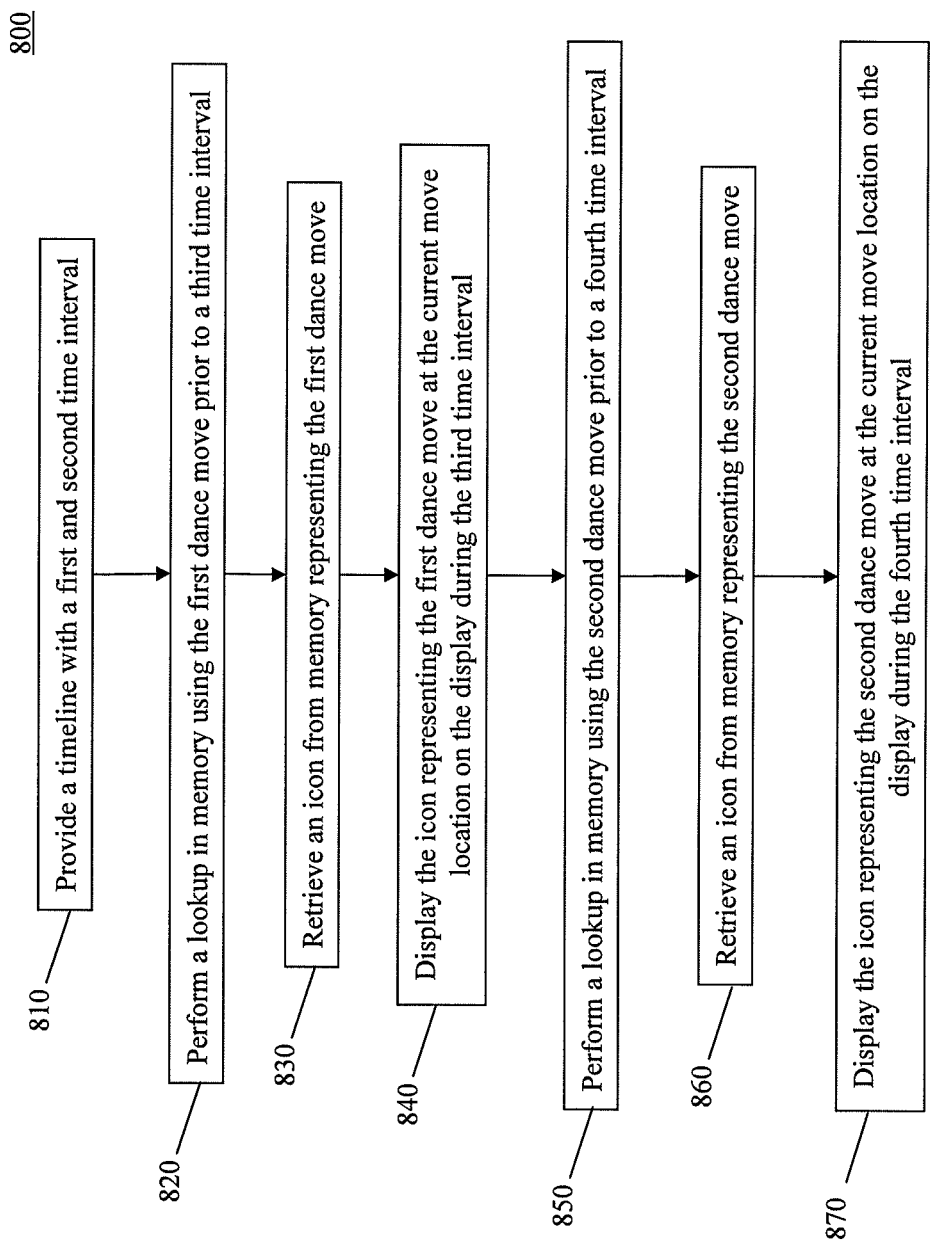

PROMPTING A PLAYER OF A DANCE GAME

CROSS REFERENCE TO RELATED APPLICATION

This application is a continuation-in-part of, claims the benefit of, and priority to co-pending U.S. application Ser. No. 12/940,794, filed Nov. 5, 2010 and entitled "Dance Game Tutorial" by Flury et al., which claims the benefit of and priority to U.S. Application No. 61/354,073, filed Jun. 11, 2010 and entitled "Dance Game and Tutorial" by Flury et al., the entire contents of which are incorporated herein by reference in their entirety. This application also claims the benefit of and priority to U.S. Application No. 61/354,073, filed Jun. 11, 2010 and entitled "Dance Game and Tutorial" by Flury et al., the entire contents of which are incorporated herein by reference in their entirety.

FIELD OF THE INVENTION

The present invention relates generally to gesture-based video games and, more specifically, to dance video games based on positional input from a user.

BACKGROUND

Although video games and video game consoles are prevalent in many homes, game controllers, with their myriad of buttons and joysticks, are still intimidating and confusing to people that do not often play video games. For these people, using a game controller to interact with the game is an obstacle to enjoying it. Also, where the game is a dance game, often an additional controller is required in the form of a dance mat or dance pad. These dance mats have specific input sections (similar to buttons on a traditional controller) that react to pressure from the user's feet. But these mats take up a lot of space and are often single use controllers—they are used just for dance games and must be rolled up and stored when not in use.

To increase a user's feeling of immersion in the game, as well as to overcome the cumbersome nature of game controllers or dance mats for users not familiar with them, some game platforms forego the use of traditional controllers and utilize cameras instead. The cameras detect a user's physical movements, e.g., the waving of his arm or leg, and then interpret those movements as input to the video game. This allows the user to use a more natural-feeling input mechanism he is already familiar with, namely the movement of his body, and removes the barrier-to-entry caused by the many-buttoned controller.

One example of a camera-based controller is the EyeToy camera developed by Logitech and used with the Sony PlayStation 2 game console. The EyeToy, and similar cameras, typically include a camera and a microphone. The EyeToy sends a 640×480 pixel video stream to the PlayStation, and the game executing on the PlayStation parses the frames of the video, e.g., calculating gradations of color between pixels in the frame, to determine what in the camera's field-of-view is the user ("player") and what is the background ("not player"). Then, differences in the stream over time are used to determine and recognize the user's movements, which in turn drive the user's interaction with the game console.

Other cameras used by game platforms include the Dream-Eye for the Sega Dreamcast, The PlayStation Eye (a successor to the EyeToy) for Sony's PlayStation 3, and the Xbox Live Vision for Microsoft's Xbox 360. These cameras all provide a typical single-input camera that can stream video or take still photographs, and some, such as the PlayStation Eye, additionally provide a microphone for audio input.

Microsoft is currently developing a depth-aware camera system in the form of Project Natal. A Natal system provides an RGB camera, a depth sensor, a multi-array microphone, and software that processes the inputs from the camera, depth sensor, and microphone. Beneficially, the Natal software provides, based on the input, a three-dimensional skeleton that roughly maps to the user's body. Specifically, rather than just determining a difference between "player" and "not player" like prior game cameras, Natal determines what is the user's right hand, left hand, head, torso, right leg, and left leg. This skeleton is preserved as a user moves his body in the camera's field of view, allowing for the tracking of specific limbs. This skeleton framework, however, is the extent of what Natal provides. Namely, no user interface is provided by Natal, and users must still use a game controller to interact with a game or menu system.

Other systems, based on non-camera technologies, have also been developed that attempt to track a user's movements. For example, the Nintendo Wii provides players with an infrared transmitter "Wii remote" that the user holds in his hand. The Wii remote is used as pointing device and has a built-in accelerometer to track changes in the Wii remote's position. The Wii remote is often paired with a "nunchuk" (which also has an accelerometer) that is held in the player's other hand, allowing the Wii to, in a sense, track the movements—or at least changes in the movements—of the user's hands. Another technology based on a hand-held controller is sixense, which is demonstrated at http://www.sixense.com High-end motion capture ("mocap") systems have also been used to track a user's movements. Typically mocap systems involve the user wearing a body suit that has dozens of white spheres located at relevant locations. The mocap cameras detect these spheres and use them to infer positional information about the user's body. Mocap systems, however, are expensive and not practical for the average user.

SUMMARY OF THE INVENTION

The invention provides methods, systems, computer program products and means for prompting a player to perform a series of dance moves. The method and computer program product are typically executed on a game platform in signal communication with a display. The inventions involve providing a timeline including at least a first time interval associated with a first dance move and a second time interval associated with a second dance move. An icon representing the first dance move is displayed at a first location on the display for the duration of the first time interval; and an icon representing the second dance move is displayed at the first location on the display for the duration of the second time interval. Typically, the icon representing the first dance move indicates at least one body part whose position is important during the performance of the first dance move.

There are additional methods, systems, computer program products and means for prompting a player to perform a series of dance moves. These are also performed by or executed on a game platform in signal communication with a display and involve providing a timeline comprising at least a first time interval associated with a first dance move, and a second time interval associated with a second dance move. An icon is displayed representing the first dance move at a first fixed location on the display for the duration of a third time interval, with the third time interval being associated with the first dance move. An icon is displayed representing the second dance move at the first fixed location on the display for the duration of a fourth time interval, the fourth time interval associated with the second dance move. Typically, the icon representing the first dance move indicates at least one body part whose role is important during the performance of the first dance move.

Either of the above inventions enjoys the following benefits and advantages. In some embodiments, the role of the at least one body part is at least one of: the position, the velocity, the direction of movement, or any combination of these. In some implementations, the first time interval and the third time interval are substantially the same time interval and the second time interval and the fourth time interval are substantially the same time interval. Additionally or alternatively, the third time interval begins slightly before the beginning of the first time interval and ends slightly before the end of the first time interval.

In some embodiments, a table lookup is performed before the third time interval using the first dance move to determine the icon representing the first dance move; and the icon representing the first dance move is retrieved from a memory.

There are also methods, systems, computer program products and means for providing dance instructions. These are typically executed on a game platform in signal communication with a display, and involve displaying, on the display, a game play screen comprising a first region and a second region and displaying a first icon in the first region, the icon representing a first dance move for the player to perform for a first time period associated with the first dance move. Then, a second icon depicting a second dance move for the player to perform is translated into the first region from the second region, at the end of the first time period.

Beneficially, the above methods, systems, computer program products and means also enjoy the following advantages. In some embodiments, before the translating step, the second icon is displayed in the second region for the first time period associated with the first dance move. In some implementations, the icon representing the first dance move includes one or more representations of a body, each representation of the one or more representations depicting a pose associated with the first dance move. In some of these implementations, each of the one or more representations of a body is an outline of a body.

In some cases, the icon representing the first dance move is displayed at a third location on the display, at a time associated with the second time interval.

In some embodiments, a score for the player's performance of the first dance move is determined; and an attribute of the icon representing the first dance move is changed based on the score. In some embodiments, the attribute is one of a color, a brightness, a background, or a size. In some implementations, a transition of the icon representing the first dance move to the third location is animated.

In some embodiments, a transition of the icon representing the second dance move to the first location is animated. In some embodiments, indicating at least one body part whose position is important during the performance of the first dance move includes highlighting the at least one body part on the icon representing the first dance move. In some embodiments, the icon representing the first dance move includes an indicia of motion for the at least one body part whose position is important during the performance of the first dance move. In some embodiments, the icon representing the first dance move comprises an indicia of motion for the player's body. In some embodiments, the icon representing the first dance move comprises an indicia of repetition of motion. In some embodiments, the icon representing the first dance move is animated.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 2A shows a series of movements spread over four beats that begin a representative dance move;

FIG. 6 depicts an exemplary icon representing a dance move.

FIG. 7 depicts exemplary icons representing dance moves.

FIG. 8 is a flow diagram depicting a method of prompting a player to perform a series of dance moves.

DETAILED DESCRIPTION

Figure 1A:
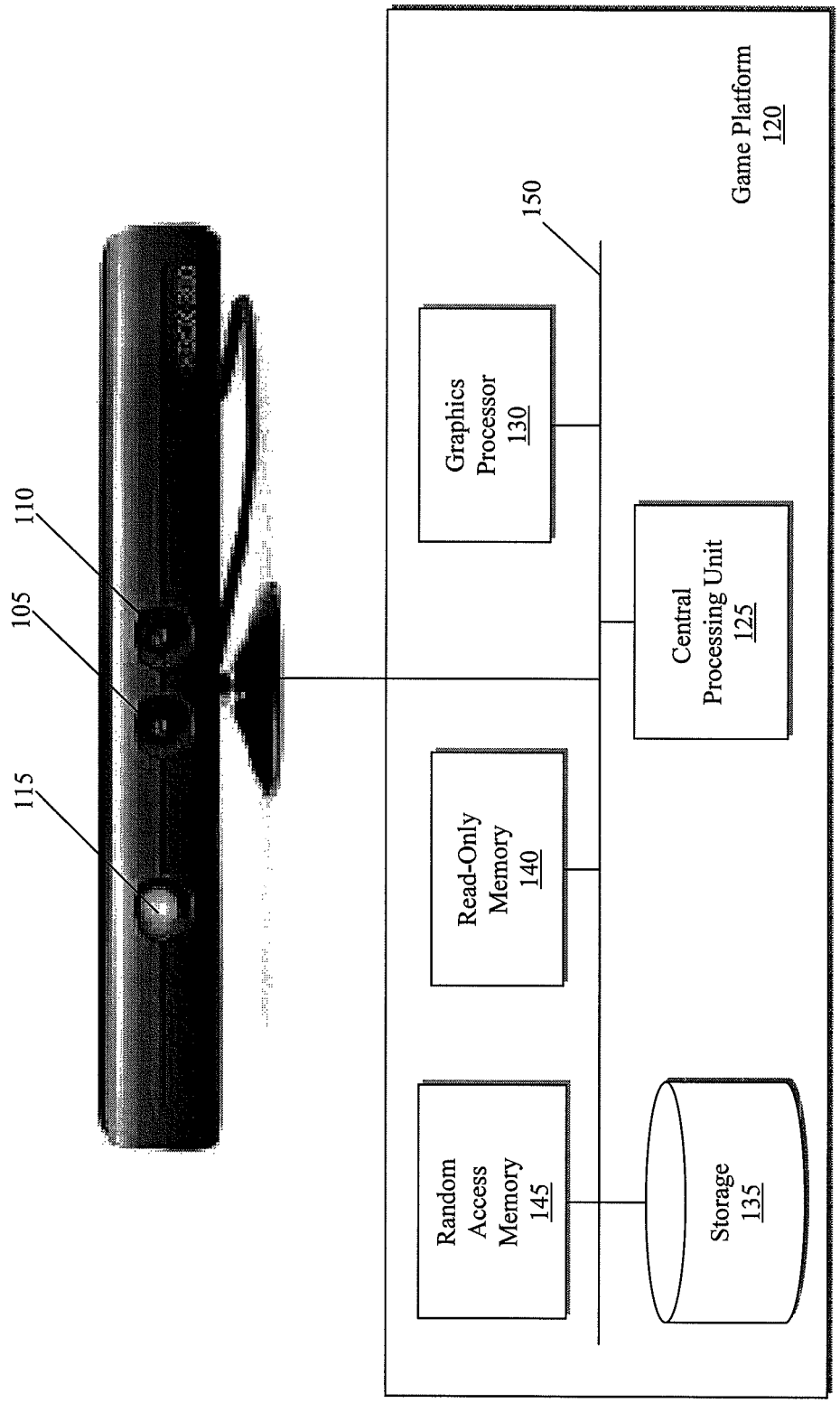
FIG. 1A depicts a game platform with a Project Natal camera system.

One embodiment of the present invention is based on the Project Natal framework developed by Microsoft Corporation of Redmond, Wash. As indicated in FIG. 1A, the Project Natal system includes an RGB camera 105, a depth sensor 110, a multi-array microphone 115, and a processor (not shown). The RGB camera 105 delivers a three-color (Red, Green, Blue) video stream to the game console, enabling facial recognition and full-body tracking The depth sensor 110 is an infrared projector combined with a monochrome CMOS sensor. This allows a game console 120 utilizing Natal to recognize objects in the camera's field of view in three dimensions instead of forcing the game console to parse a two-dimensional video-stream. The multi-array microphone 115 parses voices and sound input, while simultaneously extracting and nullifying ambient noise. Project Natal also features a processor with proprietary software that coordinates the inputs of the Natal system and provides a three-dimensional, skeleton-based system to game developers. Developers can use this system to utilize three-dimensional position information of the joints in the user's body to interact with the game platform.

Although Project Natal provides a framework for determining positional information of a user's body, it does not provide a means for grading a dance performance or teaching a user to dance. While in some embodiments, a camera-based system is used to determine positional information about the user's body in three dimensions to produce a skeleton model, in other embodiments, transducers attached to the user's body are used to detect the positions of the user's limbs and produce a skeleton model. Other embodiments use infrared pointing devices or other motion tracking peripherals. All that is required is a system than can parse movement in two dimensions to produce a skeleton model; adding dimension information from a third dimension, typically depth, simply makes the invention easier to implement due to the additional information provided to the system. In embodiments where the system is already provided a skeleton, such as Natal, relative body scale mapping is easier to accomplish.

Also shown in FIG. 1A is an exemplary game platform 120. The game platform typically includes a Central Processing Unit (CPU) 125, a graphics processor 130, storage component 135 such as a hard drive, Read Only Memory (ROM) 140, Random Access Memory (RAM) 145, all in signal communication via a bus 150. The bus 150 also connects to an input for the Project Natal System. In some embodiments, the Natal system connects to the game platform 120, e.g., an Xbox 360, via a Universal Serial Bus (USB) connection.

Figure 1B:
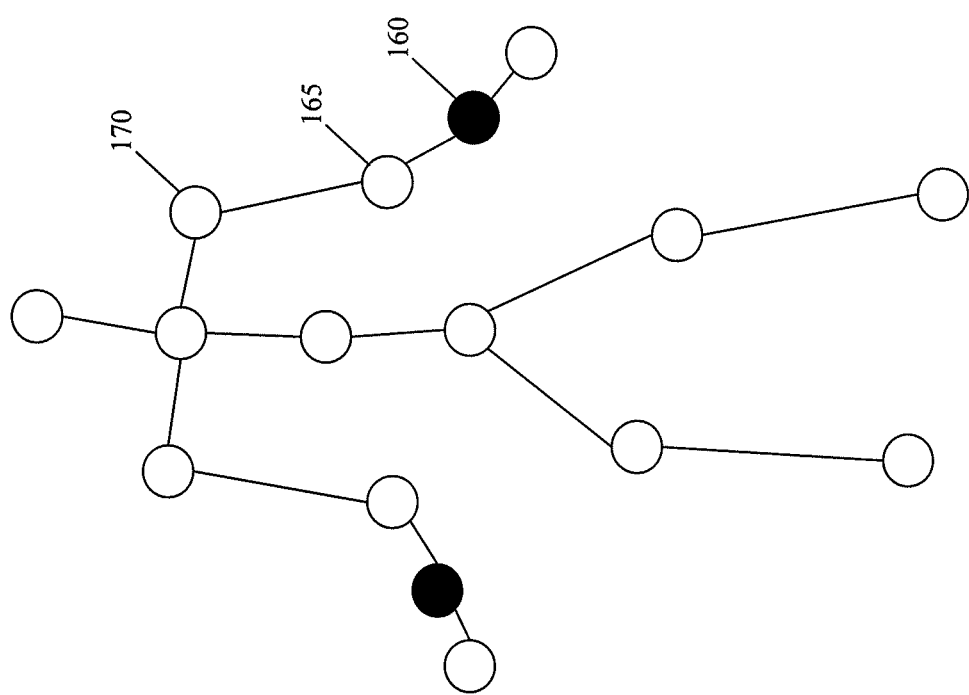
FIG. 1B depicts an example of a skeleton provided by Project Natal.

As used herein, the terms "joint", "bone", and "skeleton" are intended to have the meaning one of skill in the art of motion capture and animation would ascribe to them. For example, a skeleton can comprise bones, but the number of bones and their positions are a function of the motion capture equipment and the animation rig and do not necessarily correlate to the number and positions of bones in a human skeleton. Similarly, a joint can be at the distal endpoint of a single bone (e.g., a fingertip or the head), and need not be at a point where two bones come together. An example of the Natal skeleton is shown in FIG. 1B. The skeleton provided by the Natal system provides a framework for the dance game, and allows for tracking of not only limbs generally, but specific joints as well. For example, the wrist joint 160 on the right arm is treated separately from the right elbow 165, which is treated differently than the right shoulder 170. Additional portions of the body are also recognized, such as the pelvis, middle of the torso, the head, the neck, and the knees and feet.

One of the benefits provided by the skeleton-based system is that the skeletal model can be used to calculate scale vectors based on two or more joints. This provides a spatially relative system, i.e., what is the positional distance from body part X to body part Y compared to the positional distance from body part X to body part Z, instead of an absolute coordinate system.

A "filter" as used herein, is in effect a test, e.g., is the user's right hand in a particular position at time $t_n$? Although typically a producing a Boolean outcome, e.g., if the condition is true, the filter is satisfied and registers a success, and if not, then the filter is not satisfied. Filters may also output a contiguous score indicating the degree to which the condition is being satisfied spatially or temporally. Advantageously, multiple filters can be checked simultaneously, e.g., is the user's right hand in position x and is his left foot in position y? These filters can then be combined to determine if a user has successfully completed a pose. But pose-matching, in and of itself, is not a complete solution to scoring a sequence of dance moves.

Creating a Target Representation

The process of one implementation begins by using motion capture technology (known in the art as "mocap") to create a three-dimensional model of a target performance of a dance or part of a dance. Motion capture is a recording of human actor which can be used by a computer to reproduce the actor's performance. When the mocap session is recorded, sensors at various points on the actor's body provide the recording computer with information such as joint and limb position data over time. In the case of a dance game, the mocap is typically a recording of a dancer performing a particular dance move, or series of movements that makes up a dance move, and in one implementation, the mocap is a recording of an entire dance routine for a song. The mocap performance becomes a representation of the dance in a form usable by the game system (i.e., a "target performance"). Beneficially, the positional information received during mocap is similar to the positional information received by a camera-based game system when a user is playing a game. This similarity can be exploited to grade a user on how well he is dancing at a particular time by comparing a user's performance (the input performance) to a keyframe of the target performance. Also beneficially, the mocap data can be used to drive on-screen animations of avatars, thus demonstrating to the user the exact movements he must perform to maximize his score.

At least one notable problem arises though that prevents a direct comparison between the user's performance and the target performance: because the user and the mocap actor could have different heights and appendage lengths, or have different body types, a direct comparison of positional information of the input performance and the target performance could result in the user scoring poorly, even if he is performing the moves correctly. For example, the actor in the target performance could have an arm fully extended which, based on the dimensions of the actor's body, positions the actor's wrist two and a half feet in front of his shoulder. The user's input, also reflecting a fully extended arm, could have the (shorter-in-stature) user's wrist positioned two feet in front of his shoulder. In a purely comparative system, the user has not satisfied a test of "is the user's wrist in the same position as the wrist of target performance actor?" because the user's wrist, even though his arm is fully extended, is still a half foot closer to the reference point, i.e., the shoulder. Therefore, it is advantageous to express both the target performance and the user's performance in the same frame of reference.

Normalizing the Input Performance and Target Performance

To create a consistent frame of reference, the mocap data, which is expressed in its own representation (in some implementations even its own skeleton), and the user's input are both normalized, creating a normalized target performance and a normalized input performance. In one implementation, normalization of each joint is achieved by deriving unit vectors reflecting offsets of one specific joint relative to another specific joint.

In one embodiment, there are four different player-normalized coordinate systems: left arm, right arm, left leg, and right leg. The left arm coordinate system's origin is at the left shoulder, the up vector is away from gravity (in Natal systems, based on Natal's accelerometer). The right vector is from the left shoulder to the right shoulder, the forward vector is the cross product of the up vector and the right vector. The right arm coordinate system is just the mirror of this. The left leg coordinate system's origin is the left hip, the up vector is gravity, the right vector is from the left hip to the right hip, and the forward vector is the cross product of the up vector and the right vector. The right leg coordinate system is the mirror of this.

Figure 1C:
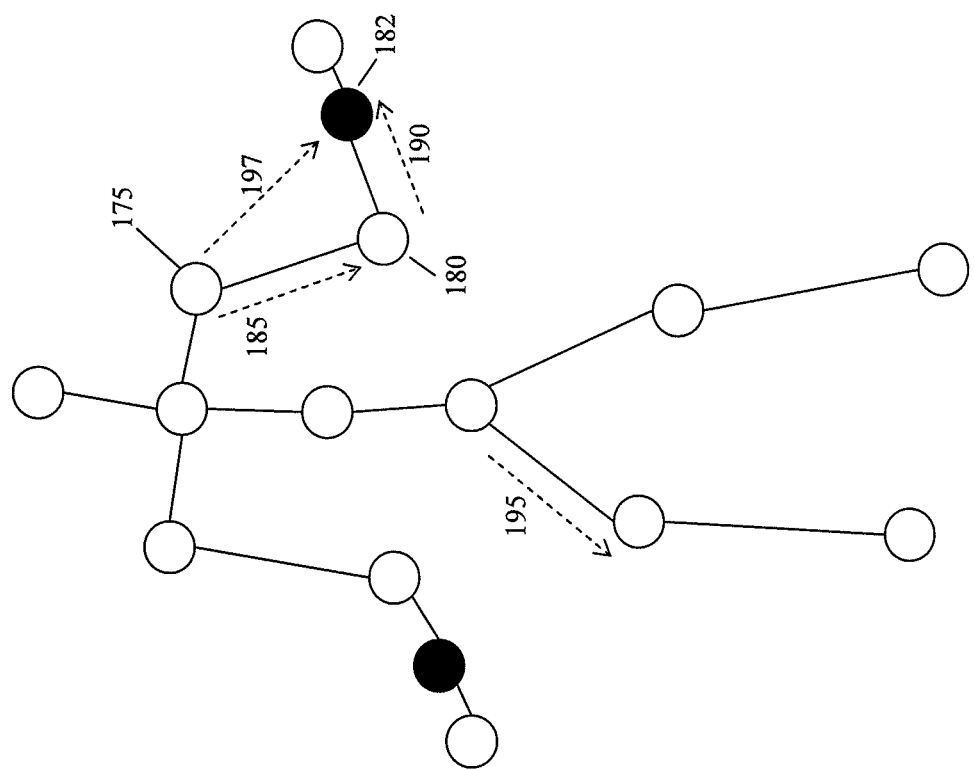
FIG. 1C depicts an example of a skeleton that includes vectors used in determining normalized joint position.

As an example, referring to FIG. 1C, the normalized position of joints on the left arm can be determined as follows. The left shoulder joint 175 is treated as the origin of the vector 185 from the shoulder to the elbow 180 and that vector 185 is transformed from the skeleton's coordinate system into the left arm coordinate system. The vector is then normalized by dividing it by its magnitude. The resulting vector is a "normalized elbow position." A similar process is applied to the input skeleton to determine a normalized elbow position for the user. This method can be used for other joints as well, e.g., the wrist position can be normalized by determining the vector 190 from the elbow 180 to the wrist 182, transforming that vector from the skeleton's coordinate system into the left arm coordinate system, and dividing it by the magnitude of that vector 190. A knee's position can be normalized based on the vector 195 between the hip and the knee, transformed from the skeleton's coordinate system into the appropriate-side leg coordinate system, and divided by the magnitude of that vector. An ankle's position can be determined based on the vector from the knee to the ankle, and so forth. Other joints such as hips are usable as well: foot raises are determined as a "squish" from foot to waist where the foot's position is drawn in towards the waist. In one embodiment, the normalized joint positions in the entire skeleton are computed, using the joint more proximal to the body core as the reference joint. In other embodiments, only a subset of the joints that have a correspondence in both skeletons are normalized, and normalization occurs on a limb-by-limb basis. In either embodiment, the normalization of the target performance can be carried out in advance of gameplay, or can be carried out during gameplay.

There are several options for normalizing joints that are not directly connected to an origin joint. Continuing the previous example with the shoulder 175 being the origin joint, the wrist's position could be normalized by determining the vector 197 from the shoulder 175 to the wrist joint 182, transforming the vector 197 from the skeleton's coordinate system into the left arm coordinate system, and dividing the resulting vector by the sum of the magnitude of the vector 185 from the shoulder to the elbow and the magnitude of the vector 190 from the elbow to the wrist. Alternatively, the vector 197 from the shoulder to the wrist could be determined, transformed, and divided by the magnitude of that vector 197. For legs, an ankle position could be based on foot position, transformed from the skeleton's coordinate system into the appropriate-side leg coordinate system, and divided by the sum of the magnitudes of the vector from the hip to the knee and from the knee to the ankle.

Typically, normalizing the target performance and the input performance yields positional information analogous to both, e.g., both have elbow position representations, both have wrist position representations, etc. Where data is not available in the mocap data or the user input for a particular joint though, in some embodiments, the game interpolates between two joints to create a "pseudo-joint" that maps to a joint in the other skeleton. For example, if the mocap skeleton has a left hip joint and a right hip joint, but a user skeleton only has a mid-pelvis joint, a mid-pelvis pseudo-joint can be synthesized for the mocap skeleton at the midpoint of the two hip joints, and used in further normalization and scoring. Alternatively, pseudo-joints could be interpolated from both data sets/skeletons to map to a third idealized skeleton. Additionally, where the input camera system is a Project Natal system, adjustments are typically made to conform the mocap skeleton to the Natal skeleton, or vice versa, e.g., dropping the hips, adjusting the shoulder height, and others. In some embodiments, the game creates a "pseudo-joint" even when data is available in both the mocap data and the user input, in order to provide a reference point or measurement that is more stable than a joint in the existing skeleton.

Comparing the Input Performance to the Target Performance

In one embodiment of the invention, every "frame" of the input performance is compared with the corresponding frame of the target performance to produce a score for that frame. This strategy, however, does not allow the game to account for inaccuracies in the user's timing, such as dancing a move with perfect position but slightly late or early. In another embodiment, the invention addresses this issue by scoring each frame of the input performance against the corresponding frame of the target performance and a range of adjacent frames. The scoring process incorporates positional and temporal score using a technique described below. For a given target frame, a score is determined by finding the maximum score of all input frames scored against that target frame.

This approach, however, can be prohibitively expensive computation-wise on some game consoles. To alleviate this, in some embodiments, only a fraction of the input frames are compared with target frames (e.g., half of the input frames). The specific frames in the input performance that are chosen for comparison can be regularly spaced, or the frames can be chosen randomly with a probability matching that fraction.

This approach, however, does not capture the intent behind a dance move where certain intermediate poses are more important and the transition movements into or out of those poses are less important. In a preferred embodiment, the input frames should be compared to the target frames most important to the dance itself.

In one embodiment, each frame of the target performance is assigned a weight (e.g., in the range 0.0 to 1.0). As stated above, each target frame receives a score based on the maximum score of all input frames scored against that target frame. In this embodiment, that score is multiplied by the weight to produce a weighted score for each target frame. The score for a move is determined by combining the weighted scores using a sum or average.

In one embodiment, each frame of the target performance is assigned a weight (e.g., in the range 0.0 to 1.0) that is computed based on the target performance. The weight for a frame of the target performance may be computed based on any number of neighboring frames of the target performance. The computation determines which target frames are the most important to the dance by detecting inflections in direction of parts of the target skeleton, or inflections in distance between parts of the target skeleton.

For example, the initial weight for a frame may be 0.0. A velocity vector can be computed for each joint in a target frame by subtracting its position in the previous frame from its position in the current frame. Whenever any joint's velocity experiences a derivative of zero with respect to time, along the x, y, or z axis in the camera-based coordinate system, or along the x, y, or z axis in the skeleton-based coordinate system (see below for a technique for computing a skeleton-based coordinate system), that frame's weight is increased. For example, if the weight of the target frame before considering the joint was w0, the new weight might be (1+w0)/2, or it may be set to a predetermined "one joint zero-derivative" value such as 0.5. If another joint's velocity simultaneously experiences a derivative of zero, the frame's weight is increased by substituting the previous weight into (1+w0)/2 again, or it may be set to a predetermined "two joint zero-derivative" value such as 0.75. Likewise, additional joints that experience simultaneous derivatives of zero make the current frame have a higher weight using the formula or a lookup table that references number of contributing joints to a weight value between 0.0 and 1.0.

Although derivatives of joint positions can be used to determine the weight for a frame of the target performance, other measurements can also contribute to the weight. For example, distances between specific joints can be computed for each frame and tracked across frames, and zero-derivative measurements can contribute to the weight. For example, the distance between wrist joints may be measured for each frame. Frames in which the distance experiences a zero derivative would increase the frame's weight by substituting its previous weight into (1+w0)/2 or looking up a value from a table as above.

Other measurements can also contribute to the weight, such as zero-derivative measurements of the overall bounding rectangle of the skeleton along x, y, or z axes in a camera-centered coordinate system or x, y, or z axes in a skeleton-based coordinate system.

However the target weight is computed, the final weight assigned to each target frame is used in the same way as described previously.

In a preferred implementation, a subset of the frames of the target performance are marked as keyframes, each keyframe representing a specific frame in the target performance with which the input performance should be compared. The target performance—comprising an entire dance routine—is aligned with a timeline, the performance being divided into moves, each move having a start time and an end time relative to the beginning of the dance, measured in units of measures/beats/ticks. Alternatively, each move can have a start time and a duration.

In some embodiments, frames of the target performance at regular intervals of beats (e.g., every tenth of a beat) or time (e.g., every tenth of a second) are marked as keyframes. Keyframes can be selected at a predetermined or fixed offset in beats or seconds from a beat boundary (e.g., exactly on the beat, and every tenth of a beat thereafter) or time boundary (e.g., starting at the beginning of the song, and every tenth of a second thereafter). In some configurations, the offset and interval are selected without regard to the importance of the dance move.

All times and durations are typically measured in units of measures, beats, and ticks, but alternatively can be measured in units of seconds. Times are measured relative to the beginning of the dance, but alternative reference points are possible, such as the end of the dance, the start of the previous move, the end of the previous move, or any other moment in time within the timeline.

Each keyframe includes a time offset relative to the beginning of the move. In addition to timing information, each keyframe can include weighting information. In some embodiments, a weight is provided for one or more keyframes in the target performance. In some configurations, the weight spans the range 0.0-1.0, and can be thought of as an indicator of how important the keyframe score is to the move overall, where 0.0 means "not important" and 1.0 means "very important." To compute a final score for a frame of an input performance with respect to a frame of a target performance, the score for the frame of the input performance is multiplied by the weight associated with the keyframe of the target performance.

In some embodiments, each keyframe can include weighting information for x, y, and z axes relative to the camera (explained below). Additionally or alternatively, each keyframe can include weighting information for x, y, and z axes relative to the entire skeleton in the target performance, or weighting information for x, y, and z axes relative to each "body zone" (limb-centered coordinate systems) in the target performance (explained below). In one implementation, relaxing the scoring is achieved by unevenly weighting the contributions of the x, y, and z axes to the Euclidean distance measurement above, where x, y, and z are taken to be in the left arm coordinate systems, right arm coordinate system, left leg coordinate system, or left leg coordinate system.

In addition to weighting information for the axes, the keyframe also includes weights for different bone groups themselves to emphasize performing a particular motion, e.g., moving the user's arms during the "shopping cart," or deemphasizing other motions one, e.g., ignoring or forgiving poor leg position during "the shopping cart". In some embodiments, a weight is provided for one or more joints within each keyframe in the target performance. In some configurations, the weight spans the range 0.0-1.0, and can be thought of as an indicator of how important the joint score is to the keyframe score, where 0.0 means "not important" and 1.0 means "very important." To compute a score for a joint in a frame of an input performance with respect to the corresponding joint in a frame of a target performance, the score for the joint in the frame of the input performance is multiplied by the weight associated with the joint within the keyframe of the target performance.

Keyframes are placed wherever necessary on the timeline to capture the most important poses in the dance sequence. Often, keyframes are placed at eighth-note boundaries, but they may be spaced irregularly depending on the dance or move to be tested.

In a preferred embodiment, the target performance is expressed as mocap data associated with a Milo file. The Milo file contains a timeline and allows for events, tags, or labels to trigger events in the game. Advantageously, the target performance is aligned to the timeline. The Milo file is also typically associated with a music track, which is also aligned to the timeline. This allows the developer to assign events to certain portions of the music track. The Milo file also has instructional timelines for providing audio cues to the user (explained below). Another benefit of using the Milo file is the ability to mark parts of the timeline, and therefore parts of the target performance, as keyframes. Keyframes are placed at specific measures or beats on the timeline and represent times to test user input.

Comparing the input performance to the target performance input at a particular keyframe may be accomplished in several ways. In one embodiment, each keyframe has a time window associated with it, beginning before the keyframe and extending beyond it. The time window is typically symmetrical around the time of the keyframe, but may be adjusted for a longer intro if a move is difficult to get into or a longer outro if the move is harder to get out of. The time window is typically of a fixed width in seconds. Alternatively, the time window can be expressed as fixed width in a variable unit of time such as beats, so that the window expands and contracts as the dance tempo slows down or speeds up, respectively.

FIG. 2A provides an illustrative example. FIG. 2A shows a series of movements spread over four beats that begin a move called "Push It." The first beat is a move marked "hands out", the second is a move marked "hands in," the third is a "right hand up", and the fourth is "left hand up" move. In FIG. 2A, three keyframe windows are displayed, each centering on a beat: the first keyframe 200 is for the "Hands out" move at beat 1, the second keyframe 205 is for the "Hands in" move on beat 2, and the third 210 is for the "Right hand up" move on beat 3. The user's input, sampled a certain number of times per second, e.g., 30, is examined to determine if it matches the target performance. For example, on beat 1 (and for a period before and after beat 1 illustrated by the umbrella around 200) the user's input is sampled to determine if, in this case, the user's hands are stretched out in front of him in a way that matches the target input which is based on the mocap performance. Then, on beat 2 (and before and after), the user's input is sampled to determine if it matches the target performance where the user's hands are pulled back in. The windows around each keyframe are to allow for variation in time for the user to complete the move. Variation is allowed for in both time and positional displacement because rarely will the user have their limbs exactly in the expected position at exactly the right time. Additionally, as stated above, some leeway is provided because the camera is an inherently noisy input.

Allowing for Variation in Time

Figure 2B:
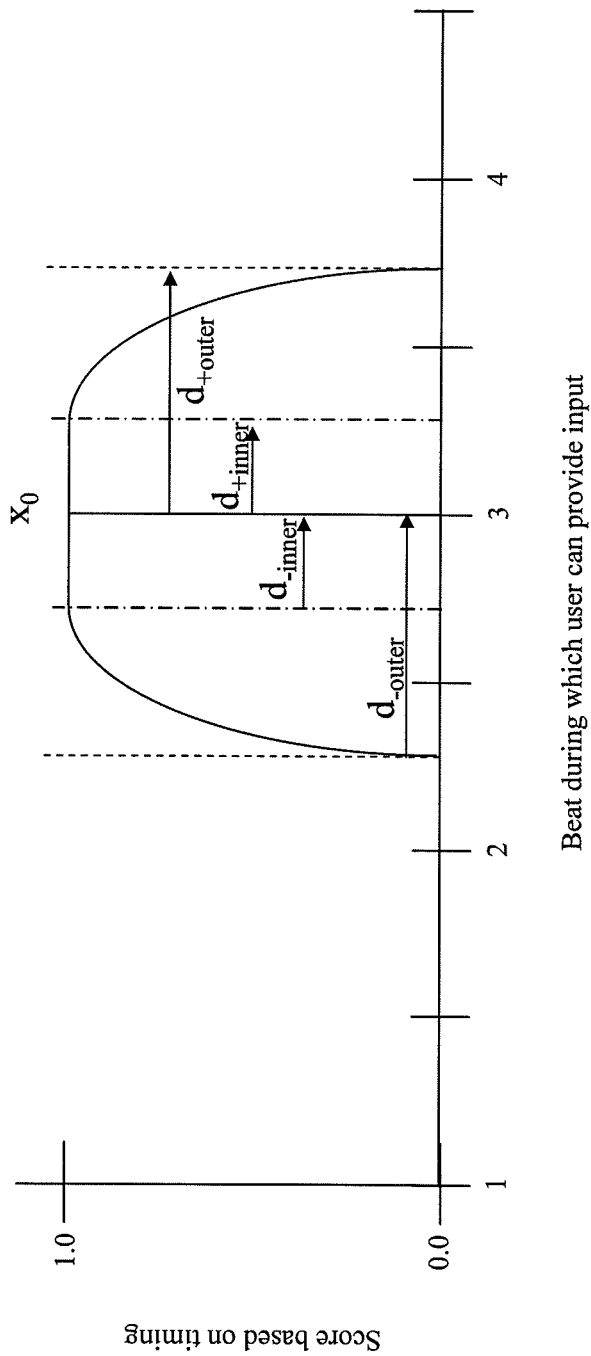
FIG. 2B shows a representative window to determine a user's timing error in performing a move.

Referring to FIG. 2B, if any of the user's inputs match the target performance within a certain inner time window around the keyframe, e.g., in the range $d_{-inner}$ to $d_{+inner}$, the user is given full score for performing that portion of the move that aligns with that keyframe (+/− to allow for the user to reach the move early or late, and the allowances either before or after are not necessarily symmetrical). This is accomplished by examining each frame of input during the window and selecting the closest match.

Between an inner time window and an outer time window, e.g., in the range $d_{-outer}$ to $d_{-inner}$ and the range $d_{+inner}$ to $d_{+outer}$, a score is still given for performing the move, but the score for that performance is reduced as the temporal "distance" outside the inner window increases. Outside the outer windows, i.e., before $d_{-outer}$ and after $d_{+outer}$, respectively, no score (or a score of zero) is given for performing the move because the user is just too early or too late. The fall off function for the score during the periods of $d_{-outer}$ to $d_{-inner}$ and $d_{+inner}$ to $d_{+outer}$ is typically a variation of $1-x^2$. This yields a parabolic shape that starts from 0 and builds to 1 between $d_{-outer}$ and $d_{-inner}$, and then falls from 1 to 0 between $d_{+inner}$ to $d_{+outer}$. More specifically, in one embodiment, the scoring curve is assembled piecewise:

For frames before $d_{-outer}$, $y(x)=0$.
For frames between $d_{-outer}$ and $d_{-inner}$:

$$y(x) = 1 - \left(\frac{x - x_0 + d_{-inner}}{d_{-outer} - d_{-inner}}\right)^2.$$

For frames between $d_{-inner}$ and $d_{+inner}$ (including $x_0$), $y(x)=1$.
For frames between $d_{+inner}$ and $d_{+outer}$:

$$y(x) = 1 - \left(\frac{x - x_0 - d_{+inner}}{d_{+outer} - d_{+inner}}\right)^2$$

For frames after $d_{+outer}$: $y(x)=0$.

But other variations are possible as well, e.g., a linear function, a constant, a parabolic function, a square-root, 1/x, $1/(x^n)$ (e.g., inverse square, inverse cube, etc.), polynomial, exponential, logarithmic, hyperbolic, Gaussian, sine, cosine, tangent, or any combination or piecewise combination thereof.

Beneficially, in some embodiments, as shown in FIG. 2A, the windows for keyframes can overlap, e.g., keyframe 205 overlaps 200. In these cases, an input frame in the overlapping area is scored against both keyframes. The maximum score of all input frames that are scored against a given keyframe is assigned as the score for that keyframe. Any keyframe that the user can match, i.e., that his input falls within an umbrella for, is considered an "active keyframe" for that input frame.

Allowing for Variation in Position

As discussed above, the user's positional success is determined based on comparing the normalized input performance to the normalized target performance. When comparing the input performance to a keyframe (again, preferably done for each sampling of the input performance), the aggregate distance is taken between the two to determine how close the normalized input performance is to the normalized target performance of the keyframe. This can be done for the whole skeleton of the target performance or can be done on a limb by limb basis. Distances are calculated as the Euclidean distance between the normalized input performance's joint position in the input frame and the normalized target performance's joint position in the keyframe.

Figure 3A:
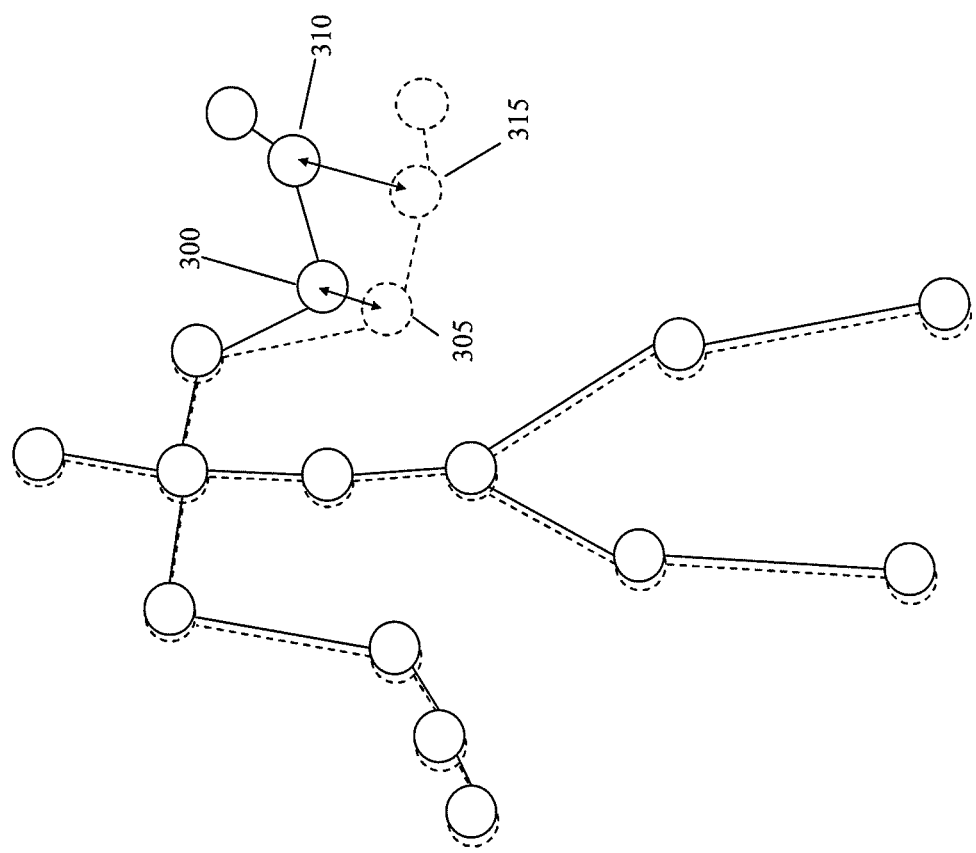
FIG. 3A shows a distance calculation between the target performance skeleton (shown in outline) and the user's input (shown solid)

FIG. 3A shows a distance determination between the target performance skeleton (shown in outline) and the user's input (shown solid). The distance between the user's elbow joint 300 and the target performance skeleton's elbow 305 is determined, reflecting the error the user is committing in terms of positioning his limb. If a filter is just testing elbow position, the analysis stops with comparing 300 and 305. If the filter also tests wrist position, the distance is determined between the user's wrist position 310 and the target performance skeleton's wrist position 315. As shown in FIG. 3A, the user's elbow position is only slightly off the target performance's elbow, whereas the user's wrist significantly out of position. These differences are then used to determine how well the user is satisfying the filter. Although arms are shown in FIG. 3A, differences between the user's leg and the target performance's leg are determined similarly.

For hips, hip velocity is a vector from the hip position in the previous keyframe to the hip position in the current keyframe. The vector is divided by the amount of time elapsed between the keyframes. To normalize the hip velocity, the velocity vector is then divided by the length of the spine. Then the resulting vector is then used for Euclidean comparison similar to that described with respect to arms and legs. Advantageously, dividing by the length of the spine normalizes the velocity measurement to account for the size of the user, e.g., a child needs to displace his hips a smaller amount than a taller adult, in order to receive the same score.

In some embodiments, the total skeleton score is an aggregate (e.g., sum) of five different scores, i.e., left arm score, right arm score, left leg score, right leg score, and hip velocity score. These are each made up of score calculations themselves for the individual joints and represent how well the user performed the move for each "body zone". For example, the left arm score is an aggregate of the wrist score and elbow score, and the leg score is an aggregate of the knee score and ankle score. Beneficially, displacement of the body, measured by hip velocity, may also be incorporated into the score calculation. Also beneficially, contributions to the aggregate skeleton score by the aggregate body zone score may be weighted per keyframe to enhance the contribution from zones that are more important to executing the keyframe pose. For example, if the left arm is most important to a particular pose, the weight of its contribution to the score can be increased, or contributions of other body zones' scores can be decreased, or some combination thereof. Beneficially, contributions to aggregate body zone score by individual joint score may be weighted per keyframe, to enhance contribution from individual joint positions that are more important to executing the keyframe pose. For example, the elbow is more important than the wrist for the "Funky Chicken" pose, so the weight of the elbow joint's score can be increased, or the weight of the wrist joint score can be decreased, or some combination thereof. Typically though, if a user's joint or body zone is in the correct position, the user will be given full credit for the correct position and the weight of that limb's contribution will not be decreased.

Figure 3B:
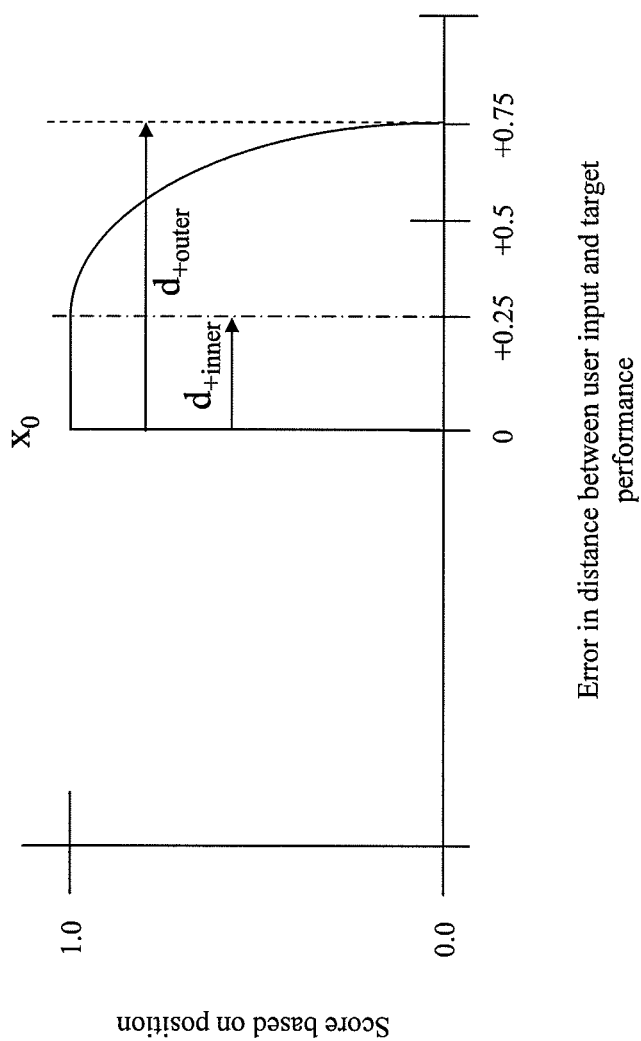
FIG. 3B shows a window of acceptable error for position when performing a move.

Referring now to FIG. 3B, like timing, there is a window of acceptable error for position. The error for position is determined based on the distance between the normalized input joint position and the normalized target joint position. If the distance is below a threshold (using the same convention as timing: $d_{+inner}$), e.g., 0.25 or less, the error is considered zero for that joint, so input frame receives a 100% score. If the distance is greater than the $d_{+inner}$, the score will fall off quickly as the distance increases to some outer boundary, $d_{+outer}$. Between $d_{+inner}$ and $d_{+outer}$, the input frame still receives some score, but the further the scored limb or joint is from the target position, i.e., the closer it is to $d_{+outer}$, the less score the user receives. Once the joint's position is so far off position that the distance falls outside $d_{+outer}$, the user receives no score (or zero score) for that frame. Unlike timing errors, which may represent times before or after the keyframe and may therefore be positive or negative, distances are always positive.

The score of an input from for a particular keyframe is determined aggregating the positional score and the timing score. In a preferred embodiment, the positional score for an input frame compared against a particular keyframe is then multiplied by the timing score for that input frame to produce an overall score for the input frame for that keyframe. If the score for an particular input frame is greater than the score of any other input frame for a particular keyframe, i.e., that input frame is the "closest" to the keyframe in terms of the combination of weighted timing and position scores, that score is the assigned score for that keyframe and is used to determine the player's overall score for the move. When the user has satisfied a certain percentage of the filters for the bar, e.g., 80%, the user is considered to have successfully performed the entire move for that bar (because it is unlikely that a user will satisfy 100% of the filters). In implementations with graduated feedback (discussed below), completing 80% may be "Perfect," 60% may be "Good," 40% may be "Fair," and 20% may be "Poor."

Compensating for the Limits of the Camera and User

The present invention overcomes one limitation of the user's ability to parse input presented on the display. Certain movements of the on-screen dancer along the z axis (into and out of the screen) are difficult for the user to parse precisely. For example, when the avatar's arm is held out directly in front of its body, and the wrist is then moved closer to or further from the avatar's body along the z axis, the degree of that motion is hard to see from the user's perspective. This is problematic for a dance game because the game may require the user to replicate this movement, and the user cannot easily judge the distance well enough to execute the movement well.

In one implementation of the present invention, this is overcome by unevenly weighting the contributions of the x, y, and z axes to the Euclidean distance measurement above. This has the effect of "flattening" the error space in a dimension if that dimension is difficult to detect visually. This is typically expressed as a front-to-back relaxing of the scoring along the z axis, because movements in a camera-based system towards the camera (forward) or away from the camera (back) are the ones being compensated for. The relaxation of scoring along an axis is automatically provided by the invention by reducing the contribution along that axis by a coefficient in the Euclidean distance calculation. The developer may also specify, for a given keyframe, coefficients for one or more axis to reduce or enhance the contribution of error along that axis to the final score.

The present invention also overcomes the limitation caused by occlusion that is inherent to any camera-based input. When a dance move requires one or more parts of the body to be moved behind other parts of the body, the occlusion of the joints makes it very difficult to determine their positions with accuracy. This is problematic because joints can be occluded in normal dance moves, such as when an arm goes behind the back, or when a move requires the user to turn sideways to the camera.

The present invention additionally overcomes a limitation with a user attempting to reproduce the target performance when the mocap for the target performance was executed by a professional dancer who is very flexible. This is problematic because a professional dancer can place his body in positions that cannot be achieved by a casual user, and therefore the user cannot score well on the move. For example, a professional dancer can touch his elbows together behind his back, but it would be unfair to penalize a typical user for this lack of flexibility, so the scoring for these moves can be relaxed.

In one implementation of the present invention, relaxing the scoring is achieved by unevenly weighting the contributions of the x, y, and z axes to the Euclidean distance measurement above, where x, y, and z are taken to be in the mocap performer's frame of reference. The frame of reference of the mocap skeleton is computed per-frame as a rotation about the z axis of the camera's frame of reference. The angle of rotation can be computed by finding the plane created by the shoulders and the center of the pelvis, finding the forward-facing normal, and rotating the frame of reference through the angle from the view plane normal to the forward-facing normal. Alternatively, the frame of reference of the mocap skeleton can be computed by starting with the plane created by both hips and the head.

In one implementation, relaxing the scoring is achieved by unevenly weighting the contributions of the x, y, and z axes to the Euclidean distance measurement above, where x, y, and z are taken to be in the left arm coordinate systems, right arm coordinate system, left leg coordinate system, or left leg coordinate system.

One the frame of reference has been rotated, relaxing scoring along an axis has the effect of "flattening" the error space in a dimension. For example, if a move requires the elbows to be pulled back very far, relaxing scoring along the z axis in the frame of reference of the mocap performer will reduce the distance the elbows need to be pulled back in order to achieve a good score. The relaxation of scoring along an axis is specified with the keyframe information as coefficients for the Euclidean distance calculation.

Beneficially, the game developer can manually weight certain moves to be more forgiving along any axis simply because a move is hard to perform.

In some implementations, weighting is based on the "confidence" that the camera system may provide for detecting a joint's position. For example, in some versions of Project Natal, the camera system provides "tracked" positional information in the form of a position for a joint and a confidence level that the position is correct. When the joint is off-screen, Natal also provides an "inferred" position. When a joint's position is inferred, e.g., when the joint is clipped or occluded, neighboring joints can be examined to better assess where the inferred joint is. For example, if an elbow is raised above the user's ear, there are only a few possible locations of the user's wrist, e.g., straight up above the elbow, down near the user's chin, or somewhere in between. In these scenarios, because the object of the game is to be fun, the maximum positional window, e.g., 0 to $d_{+outer}$, is widened so that the filtering is looser to allow for greater variation in positional differences. Additionally, the inner window of "perfect" position, zero to $d_{+inner}$, may also be widened.

In some embodiments, the invention will suspend the game if too much of the skeleton is occluded or off-screen for more than a threshold amount of time, e.g., 10 second, or 6 beats, rather than continuing to reward the user for incorrect positioning.

To assist the user in completing moves correctly, per-limb feedback is given to the user when performing a move. In some embodiments, if the user is not satisfying a filter for a limb, the game renders a red outline around the on-screen dancer's corresponding limb to demonstrate to the user where they need to make an adjustment. In some embodiments, the per-limb feedback is on the mirror-image limb from the limb that is not satisfying the filter. For example, if the user is satisfying the filter for both feet, the hips, and the left arm, but not satisfying the filter for the right arm, the game renders a red outline around the on-screen dancer's left arm. This indicates to the user that his right arm is not correct, since the user is facing the on-screen dancer and mimicking the on-screen dancer in mirror image.

Other per-limb feedback is also possible. In some embodiments, an indicator such as a "phantom" limb is drawn in the target location. Alternatively or additionally, an indicator is anchored on the errant limb and its direction and length are based on the direction and degree of error in the user's limb position. For example, if the user's wrist is below the target location, the game draws an arrow starting from where the user's wrist is located in the input performance and ending where the on-screen dancer's wrist is in the target performance. Alternatively, in embodiments where a representation of what the user is doing is displayed on-screen, the arrow is drawn starting from the user representation's wrist. In some embodiments, the indicator persists until the user satisfies the filters for the target performance's arms. In some embodiments, the intensity, geometry, material, or color characteristic of the indicator may be changed based on the degree of error for that limb. For example, the color of the indicator may become a more saturated red if the error for a limb becomes greater. Other highlighting may also be used, as may verbal cues such as "get your <limbs> movin'" where <limbs> is any body zone that is not satisfying the filter.

In some embodiments, there is an additional indicator showing how well the user is cumulatively satisfying all filters in a move, such as a ring of concentric circles under the on-screen dancer's feet. If the user has satisfied a certain percentage of the filters, e.g., 20%, the inner ring of circles is illuminated. When the user successfully performs the next threshold percentage of filters, e.g., 40%, the next set of rings is illuminated. This is repeated such that when the user has successfully performed the entire move, the outermost set of rings is illuminated. A notable side effect is that as the user is satisfying filters, the ring grows under the on-screen dancer's feet. In some embodiments, the success indicator moves with the on-screen dancer, e.g., is based on the position of the mid-point of the pelvis of the skeleton of the target performance, so that the user does not have to look at a different part of the screen to determine how well he is performing. While described in terms of discrete rings, the effect can occur continuously. Also, other shapes or graphical effects may be used, e.g., a meter indicating how many filters are satisfied, and bigger and bigger explosions or fireworks may be displayed to indicate the user satisfying more and more filters. Beneficially, in some embodiments, a qualitative evaluation is also displayed, e.g., good!, great!, or awesome!

Beneficially, the setting of the game may react to changes in the user's performance. For example, as the user is satisfying filters, a crowd of spectators may begin to circle or gather near the on-screen dancer. Or the venue in which the on-screen dancer is performing may become brighter, more colorful, or transform into a more spectacular, stimulating, or elegant venue. Correspondingly, if the user is performing poorly, on screen crowds may dissolve and walk away or the venue may become darker, less colorful, or transform into a less spectacular, stimulating, or elegant venue. Changes in venue and setting can based on the consecutive number of moves completed, e.g., after five successful moves the venue and dancers on screen change to an "improved mode." After ten successful moves the venue and dancers may change to a "more improved mode" and so forth. Changes in venue and setting can also be based on the overall score of the input performance, or on the overall score of the input performance as compared to an average performance.

Dance Training

In some implementations, there is a trainer mode to assist the user in learning a dance. In trainer mode, a dance move is demonstrated using the on-screen dancer and audible cues and no score is kept. The user is then expected to mimic the on-screen dancer's movements. If the user performs the move correctly, an indicator indicates he has performed the move correctly, the next move is demonstrated, and the user may continue practicing. If the user does not perform the move correctly, the move is repeated and the user must keep trying to perform the move before he is allowed to continue.

When the user does not perform the movement correctly, additional instruction is provided. In some embodiments, a verb timeline, normal_instructions, runs simultaneously with the target performance, and has multiple verb labels indicated on it. The verb labels refer to pre-recorded audio samples that have both waveform data and offsets. The offset indicates where the stress—or important accent—is located in the waveform data. For example, if the wave form data represents the spoken word "together," the offset indicates the first "e" sound such that playback of "together" begins before the point of the verb label on the timeline and the playback of the "e" sound aligns with the point of the verb label on the timeline. This allows the developer to specify which point on the timeline a particular syllable of the audible cue falls on. As the target performance is displayed, the waveform data is played back according to the positions of the verb labels and the offsets to provide instruction to the user that is synchronized with the movement of the on-screen dancer.

In some embodiments, a second verb timeline, slow_instructions, runs simultaneously with the target performance and may have a different or more detailed set of verb labels indicated on it. These verb labels also refer to pre-recorded audio samples with waveform data and offsets, similar to those described above. When the user cannot successfully perform a particular move after a threshold number of attempts, the game slows down and the slow_instructions timeline is used to provide additional, more detailed instruction to the user. For example, on the normal_instructions timeline, there may be a verb label that refers to an audio cue of "step and clap." On the slow_instructions timeline, this may be represented by three labels, "left foot out," "right foot together," and "clap." When the game is slowed down, rather than referencing verb labels on the normal_instructions timeline to trigger audio cues, the game references the verb labels on slow_instructions timeline. Beneficially, when the game is slowed down, there is enough time between body movements that the additional instructions can be played. In some implementations, the slowed down audible cues are stored in a different file or a different audio track than the normal speed audible cues. When the user has successfully reproduced the move, the game is sped back up and the normal_instructions timeline is used, or alternatively, the additional instructions are muted or not played.

Fitness Mode

In some embodiments, there is a calorie counter displayed on the display during the dance game to encourage users to dance. As the user dances, the calorie counter is incremented based on the Metabolic Equivalent of Task ("MET", and generally equivalent to one kcal/kg/hour) value of what the user is doing. As an example, sitting on the couch has a MET value of 1. Dancing and most low impact aerobics have a MET value of approximately 5. High impact aerobics has a MET value of 7. To determine the MET for a frame of input skeleton data, the joint velocities for all joints on the user's input skeleton are summed. To determine a joint's velocity, the joint's position (in three dimensional space) in the previous frame is subtracted from its position in the current frame. This yields a vector. The vector is divided by the elapsed time between the previous frame and the current frame. The length of the resulting vector is the velocity of that joint.

Once the sum is determined, it is exponentially smoothed to reduce transient noise. The result is a mapped to a MET scale of 1 to 7 with, in some embodiments, a sum of 0 mapping to 1 and a sum of 40 mapping to 7, with 1 representing no movement and 7 being a large or vigorous movement. Beneficially, any sum less than five can map to 1 to account for the noise inherent in the input. The mapping can be linear, piecewise linear, or any interpolation function. Using the MET value, and knowing the user's body weight (which can be input via a menu, or can be inferred based on the camera's input and a body/mass calculation), calories burned can be estimated.

METs are converted to calories-consumed-per-second using the equation of (METs*body weight in kilograms)/seconds in an hour=calories/second. This value can then be displayed on the screen, or summed over time to produce a value displayed on the screen for total calories. The value for calories/second or total calories can stored as a "high score" and, in some embodiments, can be used to increase or decrease the tempo of a song or the difficulty of a series of moves. Advantageously, this allows the user to track total calories burned, average rate burned, and other statistics over time.

Reusing Elements of a Mocap Performance

Figure 4:
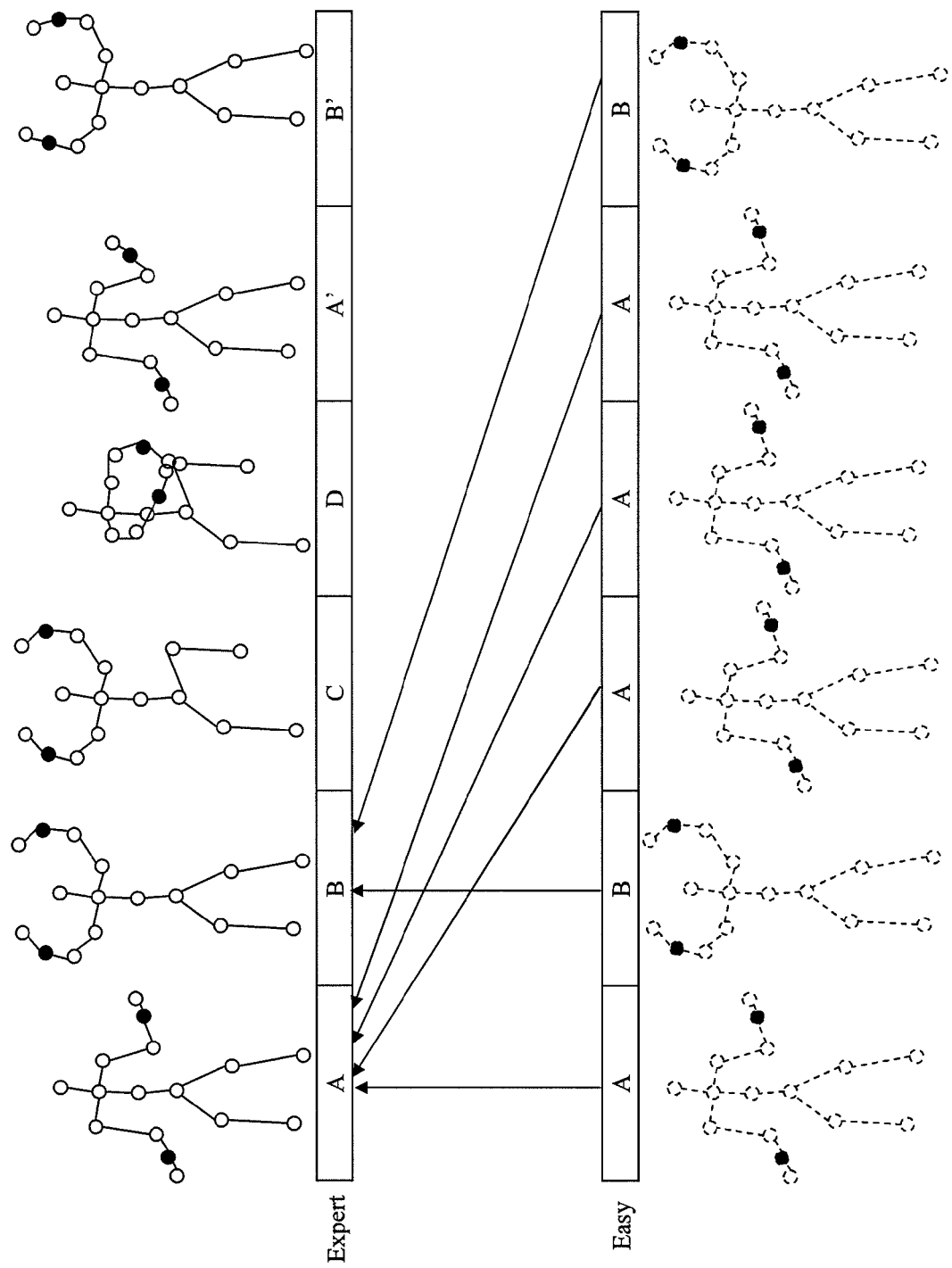
FIG. 4 depicts how a mocap for a dance routine may be refactored to create a dance routine of an easier difficulty.

In some embodiments of the dance game, the most difficult or complex target performance is recorded as one linear mocap session and only parts of the recorded performance are used to simulate easier versions of the performance. For example, in FIG. 4, the most difficult or "expert" dance routine comprises a series of movements following pattern of A, B, C, D, A, B, D, C. In some embodiments, these moves are marked on the expert timeline using "move labels," which each denote the name of a move animation and where in the timeline the move animation begins. In other embodiments, these moves are marked on a timeline that parallels the expert timeline, called "anim_clip_annotations." Rather than capture multiple target performances for each difficulty level, e.g., a dance with the previous pattern for "expert," and progressively simpler sequences for "hard," "medium," and "easy," the game can re-use the motion capture recorded for expert to simulate a pattern for any of these difficulty levels by referring to the move labels on the expert timeline. For example, given the expert sequence above, the easy sequence might be A, B, A, A, A, B, A, A. In other words, for the easy routine, a repetition of the A move replaces both the C and D moves.

The easier routines can be created programmatically, e.g., the game determines how often to repeat a movement based on a difficulty value for the move, favoring easier moves for easier difficulty levels. The easier routines can also be authored by the game developer by creating an "easy" timeline and referencing the move labels on expert track. An example of this is the "easy" track in FIG. 4, where the A sections reference the A move in the expert track and the B sections reference the B move. C and D sections, that involve a more complicated knee raise (C) and knee slap (D), are omitted from "Easy" so the user only needs to repeat the "arms out" move of A or "arms up" move of B.

Reusing moves allows space savings on the storage medium (only one target performance needs to be stored) and it allows the game developer to later change the performances of the other difficulties after the game is released if it is later determined that the performance for a difficulty setting is too hard or too easy or is boring. Since the expert performance is linear, each A section in expert will be slightly different because the mocap actor likely did not have his limbs in the exact same position every time. Examples of this are A' and B' where the skeletons are similar to A and B respectively, but the arm positions are slightly different. To make an easier difficulty target performance, the A move that is repeated in the easier difficulties can be A or it can be A', or some combination. In some embodiments, a move that is repeated in an easier difficulty uses the most recent version of that move in the timeline. In some embodiments, a move that is repeated in an easier difficulty uses the earliest version of that move that appeared in the routine. Beneficially, the animations from the expert track can also be reused when creating the "easy" performance.

A sequence of moves for an easier routine may correspond to a sequence of moves in the original expert linear mocap such that a specific pattern of moves is present in both (although they may not correspond on the timeline). In this case, the sequence of moves may be copied from the expert performance into the desired position in the easier routine's timeline. But if a sequence of moves for an easier routine does not correspond to a sequence of moves in the original expert linear mocap, individual moves may be separately copied from the expert performance into the desired position in the easier routine's timeline. Beneficially, copying larger sequences of moves from the linear mocap produces sequences with fewer animation artifacts.

Animation Blending

When moves or sequences of moves are used in easier difficulties, the moves can abut other moves that were not adjacent in the linear mocap. The transitions in the move animations between these moves can be jarring, since the skeleton in the last frame of one move can be in a completely different pose than the first frame of the next move, which would produce a sudden, nonlinear animation. Animation blending can be used to transition smoothly from the end of one move to the beginning of the next move in the sequence, if the two moves were not adjacent in the linear mocap. Using the example above of an expert performance following the pattern of A, B, C, D, A, B, D, C, when creating the easier difficulty performance, there may be a pattern of A, A that is not part of the linear mocap. Animation blending is used to transition from the end of the first A animation to the beginning of the same A animation to produce an A, A pattern. In one embodiment, the last beat of the move before an animation transition is blended with the beat before the beginning of the next move. In the example of the A, A pattern, the last beat of the A move is blended with the beat before the A move for the duration of one beat. Then the animation continues with the first beat of the second A move.

In some cases, the animation blending technique described above produces animations that are still jarring. This is often due to the large differences between the pose at the end of one move and the pose at the beginning of the next move, that can't be overcome through simple blending. In these cases, the animation can appear to jerk from one position to another during the transition, or to move in a way that's physically impossible. In some embodiments, additional mocap is recorded to produce bridge animation segments. A bridge animation segment is designed to make the transition between two other animations smooth. For example, using the example above, if the end of the A move was a very different pose than the beginning of the A move, a simple animation blend might produce a poor result. An A, A bridge animation segment would be recorded, wherein the actor would actually perform the transition from the end of the A move to the beginning of the A move. In one embodiment, the bridge animation segment is three beats long. The next-to-last beat of the first A move is blended with the first beat of the bridge animation segment in such a way that contribution from the bridge animation segment is interpolated linearly over the course of the beat from 0% to 100%. The second beat of the bridge animation segment is played without blending, then the first beat of the second A move is blended with the third beat of the bridge animation segment in such a way that the contribution from the bridge animation segment is interpolated linearly over the course of the beat from 100% to 0%. The bridge animation segment may be any number of beats long, for example two beats, and the blending can also be done over the course of any number of beats, for example two beats. The interpolation may be done in a way that is not linear, such as parabolic, inverse-squared, etc.

In some embodiments, a table is provided that is keyed by the start and end move labels associated with two animations that may abut. If a bridge animation segment is required to produce a smooth transition between the associated animations, the table will contain an entry indicating the bridge animation segment that should be used. This table is consulted for all pairs of animations that are displayed.

Beneficially, the move animations and the results of the animation blending, e.g., from A to A, or from prior move to first A or from second A to next move, can be used as the target performance, and can therefore be scored similarly to the normal gameplay performance. This provides a fluid game experience and rewards users that accurately mimic the dancer on the screen.

In a training mode, it is often necessary to isolate and repeat a move or series of moves, with a gap in between the repetitions. For example, when demonstrating the A move, it is useful for the game to count in the beat while the animation is in an idling state, then execute the move animation, then return to an idle animation. This can be accomplished in a way that is similar to the bridge animation segments described for gameplay above. In one embodiment, a three beat bridge animation segment of the transition from an idle state to the first beat of a move is recorded as mocap data. This is blended with the idle animation and move animation as described above.

Figure 5:
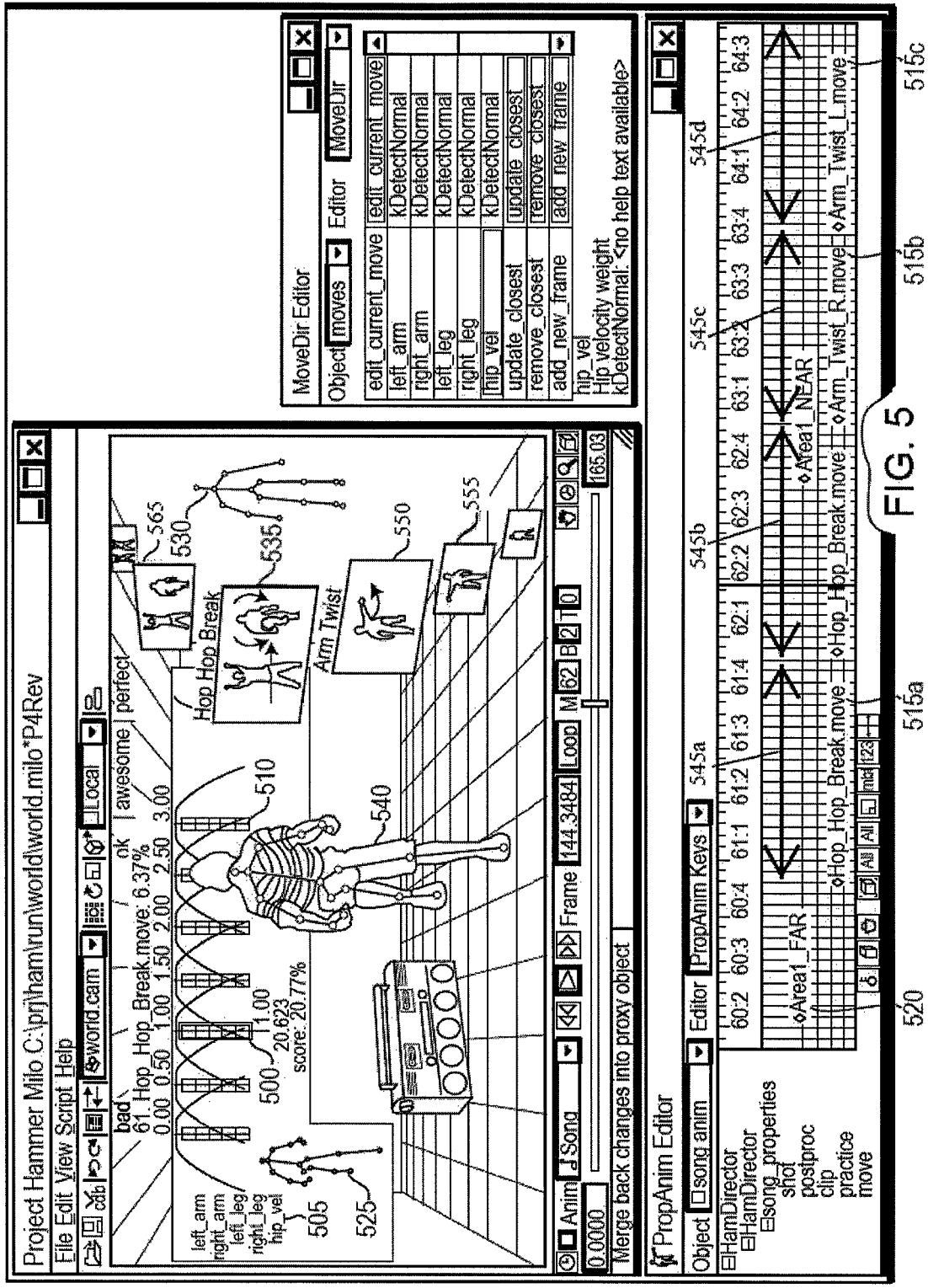
FIG. 5 depicts one embodiment of an authoring system for the dance game.

FIG. 5 shows one embodiment of an authoring system for the dance game. In FIG. 5, the keyframes 500 are depicted with their respective timing umbrellas. Each body zone being tested 505 is shown as having a corresponding portion of the filter to be satisfied (each square in the rectangle 510). The move is completely satisfied when all body zone filters are satisfied (although in some difficulty settings, only a percentage of the body zone filters need to be satisfied). The labels 515a, 515b, 515c (Hip_Hop_Break.move, Arm_Twist_R.move, and Arm_Twist_L.move, respectively) applied to each move are shown on the timeline 520. As stated above, these labels can be reused to create easier dance routines based on the mocap recording. The mocap skeleton 525 shows the desired joint movements, and the input skeleton 530 shows what the user is currently inputting. Look-ahead icons show the user what move is coming next, e.g., Arm Twist, and an icon representing the current move is displayed prominently at current move location 535. The dancer 540 on screen is a representation of what the user is supposed to input and the skeleton of the on-screen dancer 540 resembles that of the mocap skeleton 525. FIG. 5 also depicts elements shown during play of the game such as the onscreen dancer 540 and move locations, e.g., 535.

Prompting the User to Perform Dance Moves

In some embodiments, the user or player can be prompted or instructed to perform a series of dance moves. As used herein, the term "dance move" can refer to one or more motions or movements, a static pose, a series of poses, or any combination thereof. For example, a dance move can include body, limb, or joint movements, such as twisting an arm, lifting a leg, or moving the body. A dance move can also include holding the body or a portion of the body stationary or in a particular pose while moving only one limb. Additionally or alternatively, a dance move can include holding a body part or limb, e.g., the head or an arm, in a specified position while other parts of the body are in motion.

The player is prompted or instructed to perform a series of dance moves by displaying icons indicative of the dance moves on the display. For example, one or more icons can be displayed to indicate the dance move the player should currently be performing, the dance moves that the player should perform in the future (i.e., upcoming dance moves), and dance moves that the player should have already performed. In some embodiments, the gameplay display includes specific regions, locations, or positions where icons are displayed. The term location will be used herein to describe these regions, locations, or positions, and so the terms are used interchangeably with respect to where an icon is displayed A location can be, for example, based on a fixed coordinate or a set of coordinates on the gameplay display or a coordinate in the space (e.g., 3D or 2D space) represented on the gameplay display. Naturally, a location is not limited to just a fixed coordinate on the display, and can include any other coordinate or set of coordinates within a specified distance from the fixed coordinate, e.g., the location can be an area on the screen bounded by a rectangle or circle or other shape.

In some embodiments, the locations on the display are associated with particular temporal reference points. Specifically, each location conveys when the player should perform or have performed the dance moves represented by the icons displayed at that location. For example, the icon representing the dance move that the player should currently be performing is displayed at a particular fixed location or position on the display. As illustrated in FIG. 5, this location is current move location 535. Any time an icon is displayed in location 535, the dance move indicated by the icon in that location is the move the player should currently be performing. In the illustrated embodiment, the current dance move is the "Hop Hop Break" and an icon representing the "Hop Hop Break" is shown at current move location 535.

In the illustrated embodiment, the icon representing the current move is shown at a prominent location, such as at approximately the vertical midpoint of the display, to make it easier for the player to see the move In FIG. 5, the current move location 535 is displayed at a horizontally left-most and vertically centered position on the display, relative to the other icons. The icon for the current dance move can also be displayed larger than other icons on the display, again, to facilitate the player seeing the dance move they are supposed to be performing. In some embodiments, the icon for the current dance move is highlighted, displayed in different color than other icons on the display, or otherwise embellished to distinguish the current move icon from other icons.

In some embodiments, one or more icons for the dance moves that the player should perform after the current dance move (e.g., the next, or "future," dance moves) are displayed at one or more fixed or predetermined locations on the display. As illustrated in FIG. 5, the next move icon is displayed at the next move location 550 on the display, which is positioned below and to the right of the current move location 535. Icons displayed at next move location 550 indicate which dance move the player should perform after the current dance move. Additional future moves can also be displayed, e.g., at a location offset from the next move location 550. For example, a future move icon is displayed at location 555 on the display to indicate which dance move the player should perform after the next dance move, i.e., two dances moves from the current dance move.

As the song progresses, the location at which each icon is displayed changes. For example, the icon displayed at next move location 550 (indicating the next move) will be displayed at the current move location 535 at a time approximately when the player should perform that move. "Approximately" is used here to indicate that the changing of where the icon is displayed does not have to occur exactly with the time the player should perform the dance move. The icon representing the current dance move can be displayed in current move location 535 when the player is to start performing the dance move, slightly before the player is to start performing it, slightly after (e.g., in the case of video lag), etc. In some of these embodiments, when the icon displayed at next move location 550 is displayed or moved to current move location 535, the dance move icon for two moves ahead, displayed at future move location 555, is then displayed or moved to next move location 550. To a user, the movement of the icons from location to location may appear as a wheel of pictures that is rotated at certain time intervals, e.g., every two beats, every four beats, or a mix of these. While the intervals associated with a dance move or an icon can be any number of beats or any length of time, it is important to note that the intervals last longer than one beat. Thus, the icon representing the move stays in a fixed location for the duration the interval, e.g., two beats, four beats, etc. This is different than traditional dance or rhythm games where an indicator continually scrolls towards a timing bar and the user is expected to perform the move when the icon and the timing bar overlap. In one embodiment, each rotation moves a particular icon counterclockwise into a new location in time with the beginning of a new move. In some embodiments, moves may span multiple measures and the turnings of the wheel are not spaced evenly in time, but are based on when the next move is designated on the timeline.

In some embodiments, one or more icons for the dance moves for prior dance moves, i.e., moves that the player should have performed prior to the current dance move, are displayed at fixed or predetermined locations or positions on the display. As illustrated in FIG. 5, an icon representing a previous dance move is displayed at previous move location 565 or position on the screen above and to the right of the current dance love location 535, and indicates the dance move the player should have performed prior to the current dance move. Additional past moves can also be displayed, e.g., further offset above and to the right of the current move location 535.

The icons displayed at current move location 535, next move location 550, previous move location 565, and any other locations are changed as the song progresses. In order to prompt or instruct a player to perform a series of dance moves, a first icon representing a first dance move is displayed at current move location 535 to indicate that the player should perform the first dance move. At or about the time the player should begin performing a second dance move, a second icon representing the second dance move is displayed at current move location 535 to indicate that the player should perform the second dance move.

Still referring to FIG. 5, timeline 520 specifies a series of dance moves. The labels 515a, 515b, 515c (Hop_Hop_Break.move, Arm_Twist_R.move, and Arm_Twist_L.move, respectively) refer to particular dance moves, and their positions on timeline 520 denote the relative sequence of the dance moves. For example, timeline 520 specifies the following sequence of dance moves: "Hop Hop Break," "Hop Hop Break," "Arm Twist," etc.

Timeline 520 can include one or more time intervals (e.g., time intervals 545a-545d). In some embodiments, each time interval is associated with a dance move. For example, time interval 545a is associated with the dance move "Hop Hop Break," time interval 545b is also associated with the dance move "Hop Hop Break," time interval 545c is associated with "Arm Twist" for the right arm, and time interval 545d is associated with "Arm Twist" for the left arm. In some embodiments, the time interval is when the on-screen dancer 540 will perform the associated dance move. Separate from the performance of the on screen dancer 540, in some embodiments, the time interval is the interval when the player should perform the associated dance move. Furthermore, the time intervals associated with dance moves do not necessarily need to be contiguous. For example, a time interval may not be associated with a particular dance move and can be a free period, allowing the user to improvise a dance move, and there can be an icon indicating this freestyle period.

In some embodiments, the player is prompted or instructed to perform a series of dance moves by displaying icons related to the dance moves based on the sequence that timeline 520 specifies. For example, an icon representing a dance move is displayed at current move location 535 to indicate that the player should perform the first dance move. In some embodiment, the icon representing the dance move is displayed at current move location 535 for the entire duration of the time interval associated with the dance move. In this example, an icon representing "Hop Hop Break" is displayed at current move location 535 for the duration of time interval 545a, and then an icon representing "Hop Hop Break" is displayed at current move location 535 for the duration of time interval 545b. Then an icon representing "Arm Twist" for the right arm is displayed at current move location 535 for the duration of time interval 545c, and then an icon representing "Arm Twist" for the left arm is displayed at current move location 535 for the duration of time interval 545d. Thus, for particular time intervals on timeline 520, there is an associated dance move, and an icon representing that dance move is displayed at current move location 535 during that time interval.

In some embodiments, the icon representing a dance move can be displayed at current move location 535 for a different interval of time than the interval of time associated with the dance move specified by the timeline. For example, the icon can be displayed at current move location 535 for a portion of the interval of time associated with the dance move (e.g., at the beginning). The icon can be displayed at current move location 535 for an interval of time that intersects the interval of time associated with the dance move, but is not identical to the time interval, e.g., the icon can be displayed at current move location 535 just before or after the beginning of the interval of time associated with the dance move.

In some embodiments, the time interval that an icon is displayed for corresponds to musical events. For example, during gameplay, the beginning of the interval can align with the downbeat of a measure. Additionally or alternatively, the time interval can align with the third beat of a measure.

Alternatively, it can align with the second or fourth beat of a measure, on so on. These are just examples and the invention is not limited to aligning with any particular beat.

In some embodiments, the display of other icons, in addition to the icon representing the current dance move, are also based on the sequence timeline 520 specifies. One or more icons for the dance moves that the player should perform after the current dance move (i.e., the future dance moves) and/or one or more icons for the dance moves that the player should have performed prior to the current dance move (i.e., past dance moves) can be displayed. For example, an icon representing "Hop Hop Break" can be displayed at current move location 535, an icon representing "Arm Twist" for the right arm can be displayed at next move location 550, and an icon representing "Hop Hop Break" can be displayed at previous move location 565 for the duration of time interval 545b. Thus, as specified by timeline 520, an icon representing the dance move that the player should currently be performing, is displayed at current move location 535, an icon representing the next dance move is displayed at next move location 550, and an icon representing the previous dance move is displayed at previous move location 565.

In some embodiments, the icon for the next dance move dance move is translated, visually shifted, "flipped," rotated, or moved from being displayed at next move location 550 to current move location 535. Similarly, the icon displayed at current move location 535 is translated, visually shifted, "flipped," rotated, or moved to previous move location 565. "Translated" is used herein to describe changing the location that an icons is displayed, but any visual effect can be applied, such as moving, dragging, shifting, flipping (like the icon is a card on deck of cards), rotated, or other visual indicators of motion.

As an example, at or about the end of time interval 545a or the beginning of time interval 545b, the icon representing "Hop Hop" break that is displayed at current move location 535 is translated to previous move location 565, indicating that the time for performance of that move has ended. The icon representing "Hop Hop break" that is displayed at next move location 550 is translated to current move location 535, indicating that the player should now perform that move. The icon representing "Arm Twist" for the right arm that is displayed at future move location 555 is translated to next move location 550, indicating that "Arm Twist" for the right arm will be the next dance move the player should perform.

In some embodiments, the translation is animated by, for example, sliding the icon from its old position to its new position. As discussed above, the icon's size can also change, e.g., the icon can grow larger or shrink, based on whether it is being displayed at current move location 535 or another position or location. At the time of the translation, other graphics may also be displayed to draw the player's attention to the newly translated icon. For example, the icon may flash or change color.

An icon represents a dance move in various ways. FIG. 6 depicts an exemplary icon 600 representing a dance move. In FIG. 6, icon 600 represents the dance move "Hop Hop Break." Icon 600 includes outlines 605 and 610 of bodies in poses related to the dance move "Hop Hop Break." In some embodiments the icon can show a stick figure of a body in a pose related to the dance move (not shown).

An icon can also show the name or a written description of the dance move it represents. For example, icon 600 includes the text 615, which is the name of the represented dance move "Hop Hop Break." In FIG. 6, icon 600 includes one or more indicia of motion related to the dance move that the icon represents. Specifically, the icon may indicate how a body part should be moved during the dance move. For example, icon 600 includes arrows 625 that indicate that the arms should be moved from a position above the players shoulder to down around the player's hips during performance of the "Hop Hop Break." An icon can also include an indicia of repetition of motion. The indicia are not limited to the movement of just a body part—they may also indicate a direction a user is supposed to move his whole body, e.g., a step or a jump. An icon can also include indicia that a portion of the dance move should be repeated. For example, icon 600 includes repetition indicia 630 (in FIG. 6 a "D" for "double") which indicates that the last knee raise of "Hop Hop Break" should be repeated.

In some embodiments, an icon includes an animated depiction of the dance move. In these embodiments, the outline of the figure moves to show what the dance move looks like. In some embodiments though, only a portion of the body (e.g., arms), performs the movements made during the dance move. For example, if the legs are not an important part of the dance move and the player is supposed to simply stand in place, the animated icon may not move the legs and instead just animate the complicated arm and head movements.

Beneficially, in some embodiments, an icon includes an indication of one or more body parts whose role is important to the dance move that it represents. A body part that is important can be any portion of the body. For example, an important body part can be the torso (e.g., including the chest, arms, hands, and head) or the lower portion (e.g., including the waist, hips, one or both legs, one or both feet, etc.). The role of the body part can be the body part's position, velocity, direction of movement, or any combination thereof.

To indicate which portion of the body is important, in some embodiments the icons include visual markings on the outline or figure indicating the importance. For example, the important body part can be highlighted or drawn in a different color than the rest of the figure. In some embodiments, importance is indicated by filling in the depiction of the body part with a different color. Referring again to FIG. 6, icon 600 represents a move called the "Hop Hop Break," which involves raising the right knee. Icon 600 includes highlighting 619 the legs in the first part of the move, and then highlighting 620 of the right leg and 621 of the arms to indicate that their roles are important to the dance move "Hop Hop Break".

FIG. 7 depicts exemplary icons representing dance moves. Icons 710a-710g each represent a dance move. As previously described, each of icons 710a-710g includes an indication of one or more body parts whose role is important to the dance move that it represents. The indication in each is represented by highlighted body parts 713a-713g. Each of icons 710a-710g also includes one or more indicia of motion 716a-716g related to the dance move that the icon represents. In the illustrated embodiments, indicia 716a-716g have the following meanings: 716a indicates backward movement in space, 716b indicates a distinct hit or impact with the ground, e.g., a stomp, 716c indicates smaller arm sweep, 716d indicates longer arm sweep, 716e indicates lateral movement, 716f indicates a gesture, and 716g indicates rotation.

As described throughout this specification, a player's performance of a dance move can be scored. In some embodiments, one or more attributes of an icon are changed based on the score calculated for the player's performance of the move represented by the icon. For example, the icon's color, brightness, background, or size can be changed based on the score. In some embodiments, after a move is performed, and the icon is moved to the previous move location 565, the icon's background color is colored red for a poorly performed move, colored green for a move partially performed, or colored blue for a correctly performed move.

FIG. 8 is a flow diagram 800 depicting a method of prompting a player to perform a series of dance moves. The method depicted by flow diagram 800 can be implemented on, for example, a game platform (like the one described in FIG. 1A) which is typically in signal communication with a display.

The exemplary method begins with providing a timeline (step 810). The timeline includes one or more time intervals, and each time interval can be associated with a dance move. For example, in one embodiment, the timeline includes a first time interval associated with a first dance move, and a second time interval associated with a second dance move. The timeline and time intervals can be represented by any suitable data structures on media readable by the game platform, as is known in the art. For example, the timeline can be embodied as a list or array of time intervals in a game platform's memory, with each time interval including a value indicating its associated dance move. Typically a timeline is produced through an authoring system, such as the system shown in FIG. 5, but it may be auto-generated as well based on the user selecting a series of dance moves or a particular genre of dance or song that the user is interested in performing.

Prior to a third time interval associated with the first dance move, a lookup is performed (step 820) using the first dance move as the index. For example, referring to FIG. 5, and using the time interval of 545b as a reference, at a time prior to time interval 545b, a memory lookup is performed based on the dance move that is associated with time interval 545b (in this case "Hop Hop Break"). This lookup identifies the icon associated with "Hop Hop Break," which is then used as a visual asset—the icon—when it is time to indicate that the player should perform the Hop Hop Break move. In some embodiments, the memory lookup can involve using an integer assigned to the dance move as an index into an array or hashtable of icons. In some embodiments, a database of icons can be indexed by their associated dance moves or dance move names. In this example the first time interval associated with the first dance move and third time interval associated with the dance move are the same time interval, and any icon displayed for the third interval is effectively displayed for the first interval (because they are the same). In some embodiments, the third time interval is not the same as the first time interval associated with the dance move specified by the timeline, and the third time interval can start just before or just after the start of the first time interval. Note, in some embodiments, where a move is repeated, e.g., Hop Hop Break associated with time interval 545b is the same move as Hop Hop Break 545a, it is not necessary to lookup the icon again. This increases efficiency of the program by reducing table lookups.

After the memory lookup is performed, the icon representing the first dance move is retrieved from memory (step 830). Icons can be bitmaps, compressed images, vector graphics, other image types known in the art, or animations. Retrieval of the icon from memory can involve retrieving the icon's data from an array of icons or from a database. As previously noted, an icon can include outlines of bodies in poses related to the a dance move, the name or a written description of the dance move it represents, and/or an indication of one or more body parts whose role is important to the dance move that it represents or an indication of any repetition, or any combination of these.

After the icon is determined, the icon representing the first dance move is displayed at the current move location on the display during the third time interval (step 840). For example, referring again to FIG. 5, the icon for "Hop Hop Break" can be displayed at current move location 535 for the time interval 545b in order to prompt the user to perform the dance move during that time interval.

Next, prior to a fourth time interval associated with the second dance move, a lookup in memory using the second dance move is performed (step 850). For example, at a time prior to time interval 545c, a memory lookup is performed based on the dance move "Arm Twist," which is associated with time interval 545c. The lookup identifies the icon associated with the "Arm Twist" dance move. The memory lookup can be performed using techniques similar to those described with respect to step 820. After the memory lookup is performed, the icon representing the second dance move is retrieved from memory (step 860).

Then, the icon representing the second dance move is displayed at the current move location on the display during the fourth time interval (step 870). For example, the icon for "Arm Twist" is displayed at current move location 535 for the time interval 545c. This prompts the user to perform the dance move "Arm Twist." In some embodiments, the icon representing the second dance move replaces the icon representing the first dance move at current move location 535. In some embodiments, the icon representing the second dance move is translated from another location on the display (e.g., next move location 550) to current move location 535 as previously described.

Determining an Active Player With Multiple Skeletons Available

When more than one player is within the field of view of the camera, the system must determine which player is the active player, and which player is the inactive player, for the purposes of shell navigation and gameplay.

For this discussion of determining the active player, it is useful to define two terms. A skeleton is considered "valid" if it is not sitting and it is facing the camera. Also, "queuing a skeleton for activation" means setting a timer to go off at particular time, at which point the active skeleton is set to be inactive and the queued skeleton is set to be active.

In some embodiments, queuing a skeleton for activation does not set a timer if that skeleton is already queued for activation. In some embodiments, queuing a skeleton for activation does not set a timer if any skeleton is already queued for activation. In some embodiments, the timer is always set for 1 second in the future.

In some embodiments, determining the active player begins when a frame of skeleton data is received by the system. In some embodiments, a frame of skeleton data is received and processed every thirtieth of a second. In each frame, there may be any number of distinct skeletons in the skeleton data. At any time, one of the skeletons in the skeleton data is considered active, and the rest, if any, are considered inactive.

In some embodiments, if the active skeleton is behind—further from the camera than—an inactive skeleton, or the active skeleton is near the edge of the camera's view, then the system can search for an inactive skeleton to activate. In some embodiments, the active skeleton is considered near the edge of the camera's view if its centerline is in the left or right fifth of the camera's view. If there is an inactive skeleton nearer to the center of the camera's view than the active skeleton, the inactive skeleton can be queued for activation.

In some embodiments, if an inactive skeleton that is queued for activation is not present in the current frame, or is not valid, or is crossing its arms, or is behind the active skeleton, the queued activation of that skeleton is cancelled. In some of these embodiments, the queued activation of the inactive skeleton is not cancelled if the active skeleton is near the edge of the camera's view.

In some embodiments, if the active skeleton is not in the frame, or if the active skeleton is invalid, but there is at least one inactive skeleton, the system immediately activates one of the inactive skeletons.

In some embodiments, if an inactive skeleton's hand is raised and the active skeleton's hand is not raised, the inactive skeleton is queued for activation or scoring for dancing. Beneficially, this allows a user to express intent to control the shell or have their performance be the one that is graded by raising their hand.

Multi-Player Modes—Animation

A dance game can be more satisfying if it provides multi-player competitive or cooperative game modes. One difficulty that arises is that the original song and the choreography for the song may not be balanced such that two players can have equal opportunities to contribute to their competing or combined scores (for competitive and cooperative modes, respectively). In addition, the song may be too short to give either player sufficient opportunity to perform for a satisfying duration.

In one embodiment, the invention addresses these shortcomings by artificially extending the song and its choreography by looping back to previous parts of the song to give multiple players an opportunity to dance the same section. Beneficially, this provides the same potential scoring for all players in a multi-player mode. Although animation blending in this context is primarily intended for looping back to previous parts of a song, the mechanism applies equally well to any non-contiguous jump between points in the song, or jumps between jumps points in more than one song.

In one embodiment, a section that is to be repeated in multi-player mode is indicated in a MIDI file, in a track called multiplayer_markers, aligned with the audio timeline. Alternatively, the markers can be located in the same MIDI track as other MIDI data, or can be indicated across multiple MIDI files, in respective tracks called multiplayer_markers, or can be located in the same MIDI track as other MIDI data, spread across multiple MIDI files. The section indicators are special multiplayer text events, MP_START and MP_END. During gameplay, when the game time reaches the time of the MP_END text event the first time, the game time jumps to MP_START and the other player begins play. When the game time approaches the time of MP_END the second time, it continues without jumping.

In one embodiment, when the game jumps to a non-contiguous point in the song, for example to the point designated by MP_END, animation blending can be used, as described above for creating easier difficulties, to make the transition less jarring. For example, if it is determined that a single section should be repeated, the animation of the last beat of the section can be blended with the animation the beat before the beginning of the first beat of the section. The animation blending can take place over two beats, or it can extend over multiple beats. In all cases, the animation for the end of the section is blended with the animation before the beginning of the section such that the blend begins with 100% contribution from the end of the section and ends with 100% contribution from before the beginning of the section. The interpolation can be linear, or can use any other interpolating function such as polynomial.

As in animation blending for easier difficulties, the blend from the end of a section to the beginning of the section can produce an unrealistic movement. In this case, bridge animation segments can be used, as discussed above regarding producing an easy difficulty.

Multi-Player Modes—Audio

Extending a song by looping back to previous sections brings with it some inherent difficulties in animation. The invention addresses these difficulties using animation blending and bridge animations. Non-contiguous jumps in the timeline of the song, or jumps between songs, also cause difficulties with continuity of the audio track. As with animation, the audio for the end of a section does not always merge smoothly into the audio for a section that is not adjacent in the song's timeline. Jarring discontinuities in the audio track can interfere with the users' enjoyment of multi-player modes. The invention provides seamless audio track transition playback during multi-player modes to address this difficulty. For example, if the audio follows the sequence of sections A, B, C, it may be desirable in a multiplayer mode to loop from the end of the B section back to the beginning of the B section. The invention allows this extension to happen seamlessly.

In one embodiment, a section that is to be repeated in multi-player mode is indicated in a MIDI file in a track called multiplayer_markers, with MP_START and MP_END text events, as described above. In the example above, an MP_START text event in the MIDI file would be aligned with the beginning of the B section, and an MP_END text event would be aligned with the end of the B section, indicating that the entire B section is to be repeated in multi-player mode. Alternatively, a section that is to be repeated in multi-player mode can be indicated across multiple MIDI files, in respective tracks called multiplayer_markers, or can be located in the same MIDI track as other MIDI data, spread across multiple MIDI file.

In one embodiment, when there will be a transition from one part of the song to a non-adjacent part of the song, the audio track for a period of time before the origin of the transition is blended with the audio track for the same duration before the target of the transition, or the audio track for a period of time after the origin of the transition is blended with the audio track for the same duration after the target of the transition, or some combination. This is similar to how animations are blended when producing an easy difficulty. For example, one beat worth of audio before the MP_END event could be blended with one beat worth of audio before the MP_START event, then one beat worth of audio after the MP_END event could be blended with one beat worth of audio after the MP_START event. The blending is done such that at the beginning of the blend, the contribution from the audio before the MP_END event is 100%, and at the end of the blend, the contribution of the audio from after MP_START is 100%. This can be a linear crossfade, or it can use any other interpolating function, such as polynomial.

In some cases, as with animation blending, the result of audio blending is still jarring. This is often due to the discontinuity in the harmonic progression of the song when moving to a different place in the music, or presence or absence of vocal or instrument parts before or after the transition. In some embodiments, as with bridge animation segments, additional audio is recorded to produce waveform data for a bridge audio segment. The bridge audio segment is designed to make the audio transition between two non-adjacent parts of the song sound smooth. Using the example above with sections A, B, and C, if the game will repeat section B, a bridge audio segment can be provided that smoothly transitions from the last part of section B into the first part of section B.

In one embodiment, the waveform data for bridge audio segments are included in one or more additional bridge audio tracks in the multi-track audio data, and the bridge audio tracks are muted unless non-sequential looping is taking place. However, each bridge audio segment could be located in its own file referenced by the game authoring, or all bridge audio segments could be located in a single file, and the offset and duration of each segment of bridge audio in the single file would be stored as unique text events in the MIDI file.

In some embodiments, all bridge audio segments are of a fixed duration in beats, with a fixed number of beats before the transition. In these embodiments, the original song audio is played until a fixed amount of time in beats before the end of the transition. Then the original song audio track or tracks are muted, and the bridge audio segment is played until the transition point. Then the "current time" is moved to the target of the transition and the remainder of the bridge audio segment is played. At this point, the bridge audio track is muted and the original song audio track or tracks are unmuted. For example, all bridge audio segments might be three beats long, with one beat before the transition. Using the example above with sections A, B, and C, if the game will repeat section B, a 3-beat-long bridge audio segment from the end of B to the beginning of B may be provided. One beat before end of B, the original audio tracks are muted and the B-to-B bridge audio segment is played. When the end of B is reached, the current time is moved to the beginning of B, and the bridge audio segment continues playing for two more beats. After two beats, the bridge audio track is muted and the original tracks are unmuted. Beneficially, aligning the audio and changing the current time in this way allows for a single, consistent timeline for audio playback, animation, and other aspects of gameplay. Alternatively, the current time may be changed at the end of the bridge audio segment's playback, and moved directly to two beats after the beginning of B section. This example discusses bridge audio segments that are all 3 beats long, which start playing one beat before the transition, but other embodiments may have bridge audio segments that are all longer or shorter, or that all begin earlier or later with respect to the transition.

In some embodiments, the song audio and bridge audio segments may be muted and unmuted, as described. Alternatively, the song audio and bridge audio segments may be mixed, such as by lowering the normal song audio volume to 10% and playing the bridge audio segment at 90%. It is also possible to cross-fade the song audio and bridge audio segments. For example, the last beat of the B section would start with 100% of the song audio and end with 100% of the bridge audio segment, then the bridge audio segment would play at 100%, then the second beat of the B section would start with 100% of the bridge audio segment and end with 100% of the second beat of the song audio. The interpolation can be linear, but it can also use any other interpolating function, such as polynomial.

In some embodiments, as described above, the bridge audio segments can be of a fixed duration in beats or seconds. In other embodiments, each bridge audio segments can be of different durations. Beneficially, the ability to specify bridge audio segments of different durations makes it easier to provide a musically seamless transition, using more time if necessary, to achieve the proper harmonic and orchestration transitions, and less if possible, so that the playback departs as little as possible from the original music.

In one embodiment, all the waveform data for bridge audio segments is located on a single bridge audio track, bridge_audio, in the multi-track audio data file. The bridge audio waveform data for a given transition is divided into the sub-segment before the transition and the sub-segment after the transition. The sub-segment before the transition is positioned in the bridge_audio track so that it ends exactly at the transition point, corresponding to the MP_END text event in the associated MIDI file. The sub-segment after the transition is positioned in the bridge_audio track such that it begins exactly at the target of the transition, corresponding to the MP_START text event in the associated MIDI file.

In some embodiments, where the bridge audio segments are of a fixed duration, the beginning and end of the bridge audio segments is implicit in the fixed duration and the fixed amount of time before the transition, as described above.

In the preferred embodiment, the specification of the beginning and end of bridge audio segments is provided in a MIDI file, in the multiplayer_markers track, although the beginning and end of the bridge audio segments could be in their own MIDI track, or in their own MIDI file whose timeline is aligned with the audio timeline. In the multiplayer_markers track, special multiplayer text events, MP_BRIDGE_START and MP_BRIDGE_END, denote the beginning and end of a bridge audio segment. As the game is played in a multi-player mode, when an MP_BRIDGE_START text event is encountered on the timeline of multiplayer_markers, the original audio track or tracks are muted and the bridge_audio track is unmuted. As described above, attenuation of the original track or crossfading with the bridge audio track can be used instead of muting and unmuting. Playback continues until the transition point itself, which is indicated by the MP_END text event. At this point, the "current time" is set to the target of the transition, marked by the MP_START text event, and the bridge audio track continues. When the MIDI MP_BRIDGE_END event is encountered, the original audio track or tracks are unmuted, and the bridge audio track is muted. Note that when the transition is backwards in time, the MP_BRIDGE_END event occurs earlier on the timeline than the MP_BRIDGE_START event, since the current time is modified between them. Beneficially, dividing the bridge audio segments and modifying the current time at the transition point as described allows there to be a single concept of current time for the audio, animation, and gameplay. In other embodiments, the current time is modified only after the playback of the bridge audio segment is complete, and at that point it is set to the location of MP_START plus the length of the second sub-segment of the bridge audio segment. As described above, a section that is to be repeated in multi-player mode also can be indicated across multiple MIDI files, in respective tracks called multiplayer_markers, or can be located in the same MIDI track as other MIDI data, spread across multiple MIDI file.

Additional Variations

The examples given herein of a user satisfying a filter by completing a series of moves can be adapted to satisfy a "mirror mode" as well, where the user provides input that mirrors the target performance, e.g., providing input using a right hand when the target performance uses a left hand, providing right leg input when the target performance uses a left leg, and so forth.

Additionally, where a target performance skeleton is provided, it can be generated beforehand, or can be generated during execution of the game based on the motion capture data.

Any system that can detect movement can be used as long as positions of the scored joints can be determined in either two-dimensional space or three-dimensional space to create or simulate a skeleton. For two-dimensional implementations, scoring is typically adjusted to compare the projection of the target performance and the projection of the input performance onto a plane parallel to the screen. Although the system and technology has been described in terms of a camera input system like Natal, camera systems that utilizes sensors on the user's body, e.g., PLAYSTATION® Move, or systems that use sensors held in the user's hand, e.g., the NINTENDO® Wii, may also be utilized. In those implementations where only hand held sensors are utilized by the user, testing for leg input is ignored or not performed.

Although the embodiments described herein use dancing as an example, and the performance is typically accompanied by a song, the performance can also be movements that occur on a timeline with no musical accompaniment, e.g., a series of yoga poses, movements in a martial arts kata, or the like.

In some implementations, the mocap data is mapped to a skeleton similar to that used to reflect the user's input. Thus, the mocap data is used to generate an ideal skeleton that represents a performance of the dance routine in a format that is directly comparable to the skeleton representing the user's input. Then, during the game, as the user provides input, the user's skeleton is compared to the ideal skeleton, in effect normalizing the target input (the target performance) and actual inputs (the user's performance) to the same frame of reference, i.e., both performances are expressed in terms of the same skeleton-based technology.

In some embodiments, rather than matching position necessarily within a time window as described above, filter types are predefined and used to test user input. For example, proximity filters tests if a joint in a particular position, or close to a particular other joint, e.g., "are the left wrist and right wrist less than, greater than, or within a delta of a certain distance of one another. Another filter is a displacement filter which tests if a joint has moved a certain distance between times $t_0$ and $t_n$. Another example is the angle filter, which tests if a joint is at a particular angle from the origin. One or more of these filters is then hand-inserted (or "authored") into the timeline and bound to joints such that at a particular time, the condition is tested, e.g., "has the RIGHT WRIST moved from $x_0$ to $x_n$ since I began tracking it?" would be a displacement filter. If the user's wrist had, the filter would be satisfied. Yet another filter is an acceleration filter which tests if a joint or bone has accelerated or decelerated between times $t_0$ and $t_n$. An acceleration filter can also test whether the magnitude of the acceleration matches a predetermined value.

In these embodiments, multiple filters can be overlaid on the timeline, and tested, in effect, simultaneously. An overall score for the frame is determined based on contributions from all of the active filters during a given frame. The filters can output a Boolean, and the score is computed from those. Or—in some implementations—the outputs are continuous, and the aggregate score is computed from those. Similar to the system described above, contributions from each active filter can be weighted differently in their contributions to the score. For Boolean filters, successfully completing 3 out of 5 filters gives the user a score of 0.6. In some implementations, each keyframe comparison gives a percentage credit for the move as a whole being correct. The user's score may be adjusted based on the aggregate score for a keyframe. Or the aggregate score for a keyframe may be quantized into groups, each group being compared to one or more thresholds, each group associated with a score that is added to the user's score. In any of these, if the user achieves a threshold score for a move, where if the user meets or exceeds the threshold, e.g., 80%, the user is considered to have successfully performed the move.

In some embodiments, execution of game software limits the game platform 120 to a particular purpose, e.g., playing the particular game. In these scenarios, the game platform 120 combined with the software, in effect, becomes a particular machine while the software is executing. In some embodiments, though other tasks may be performed while the software is running, execution of the software still limits the game platform 120 and may negatively impact performance of the other tasks. While the game software is executing, the game platform directs output related to the execution of the game software to a display, thereby controlling the operation of the display. The game platform 120 also can receive inputs provided by one or more users, perform operations and calculations on those inputs, and direct the display to depict a representation of the inputs received and other data such as results from the operations and calculations, thereby transforming the input received from the users into a visual representation of the input and/or the visual representation of an effect caused by the user.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as, a game platform such as a dedicated game console, e.g., PLAYSTATION® 2, PLAYSTATION® 3, or PSP® manufactured by Sony Corporation; NINTENDO WII™, NINTENDO DS®, NINTENDO DSi™, or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer or game console also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory can be supplemented by, or incorporated in special purpose logic circuitry.

To provide for interaction with a user, the above described techniques can be implemented on a computer or game console having a display device, e.g., a CRT (cathode ray tube) or LCD (liquid crystal display) monitor, a television, or an integrated display, e.g., the display of a PSP®, or Nintendo DS. The display can in some instances also be an input device such as a touch screen. Other typical inputs include a camera-based system as described herein, simulated instruments, microphones, or game controllers. Alternatively input can be provided by a keyboard and a pointing device, e.g., a mouse or a trackball, by which the user can provide input to the computer or game console. Other kinds of devices can be used to provide for interaction with a user as well; for example, feedback provided to the user can be any form of sensory feedback, e.g., visual feedback, or auditory feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical user interface through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results.

What is claimed:

1. A method of prompting a player to perform a series of dance moves, the method executed on a game platform in signal communication with a display, the method comprising:
providing, using the game platform, a timeline comprising at least a first time interval associated with a first dance move, and a second time interval associated with a second dance move;
displaying, on the display, an icon representing the first dance move at a first location on the display for the duration of the first time interval; and
displaying, on the display, an icon representing the second dance move at the first location on the display for the duration of the second time interval;
wherein the icon representing the first dance move comprises one or more representations of a body and indicates on the one or more representations of the body at least one body part whose position is important during the performance of the first dance move.

2. A method of prompting a player to perform a series of dance moves, the method executed on a game platform in signal communication with a display, the method comprising:
providing, using the game platform, a timeline comprising at least a first time interval associated with a first dance move, and a second time interval associated with a second dance move;
displaying, on the display, an icon representing the first dance move at a first fixed location on the display for the duration of a third time interval, the third time interval associated with the first dance move; and
displaying, on the display, an icon representing the second dance move at the first fixed location on the display for the duration of a fourth time interval, the fourth time interval associated with the second dance move;
wherein, the icon representing the first dance move comprises one or more representations of a body and indicates on the one or more representations of the body at least one body part whose role is important during the performance of the first dance move.

3. The method of claim 2 wherein the role of the at least one body part is at least one of: the position, the velocity, the direction of movement, or any combination of the foregoing.

4. The method of claim 2 wherein the first time interval and the third time interval are substantially the same time interval and the second time interval and the fourth time interval are substantially the same time interval.

5. The method of claim 2 wherein the third time interval begins slightly before the beginning of the first time interval and ends slightly before the end of the first time interval.

6. The method of claim 2 further comprising:
performing, using the game platform, a table lookup using the first dance move before the third time interval to determine the icon representing the first dance move; and
retrieving, using the game platform, the icon representing the first dance move from a memory.

7. A method of providing dance instructions executed on a game platform in signal communication with a display, the method comprising:
displaying, on the display, a game play screen comprising a first region and a second region;
displaying in the first region a first icon representing a first dance move for the player to perform for a first time period associated with the first dance move; and
translating, using the game platform, into the first region from the second region, at the end of the first time period, a second icon depicting a second dance move for the player to perform;
wherein, the first icon representing the first dance move comprises one or more representations of a body and indicates on the one or more representations of the body at least one body part whose role is important during the performance of the first dance move.

8. The method of claim 7, further comprising before the translating step, displaying, in the second region, the second icon for the first time period associated with the first dance move.

9. The method of claim 7, wherein each representation of the one or more representations depicts a pose associated with the first dance move.

10. The method of claim 9, wherein each of the one or more representations of a body is an outline of a body.

11. The method of claim 7, further comprising displaying, on the display in a third region of the game play screen, at a time associated with the second time interval, the icon representing the first dance move.

12. The method of claim 11, further comprising:
determining, using the game platform, a score for the player's performance of the first dance move; and
changing, using the game platform, an attribute of the icon representing the first dance move based on the score.

13. The method of claim 12, wherein the attribute is one of a color, a brightness, a background, or a size.

14. The method of claim 11, further comprising animating, using the game platform, a transition of the icon representing the first dance move to the third region.

15. The method of claim 7, further comprising animating, by the game platform, a transition of the icon representing the second dance move to the first region.

16. The method of claim 7, wherein indicating at least one body part whose position is important during the performance of the first dance move comprises highlighting the at least one body part on the icon representing the first dance move.

17. The method of claim 7, wherein the icon representing the first dance move comprises an indicia of motion for the at least one body part whose position is important during the performance of the first dance move.

18. The method of claim 7, wherein the icon representing the first dance move comprises an indicia of motion for the player's body.

19. The method of claim 7, wherein the icon representing the first dance move comprises an indicia of repetition of motion.

20. The method of claim 7, wherein the icon representing the first dance move is animated.

* * * * *